(12) United States Patent
Cho et al.

(10) Patent No.: US 10,714,049 B2
(45) Date of Patent: Jul. 14, 2020

(54) ELECTRONIC DISPLAY BORDER GAIN SYSTEMS AND METHODS

(71) Applicant: Apple Inc., Cupertino, CA (US)

(72) Inventors: Myung-Je Cho, San Jose, CA (US); Jim Chou, San Jose, CA (US); Marc Albrecht, San Francisco, CA (US); Jean-Pierre Guillou, Los Gatos, CA (US)

(73) Assignee: Apple Inc., Cupertino, CA (US)

(*) Notice: Subject to any disclaimer, the term of this patent is extended or adjusted under 35 U.S.C. 154(b) by 116 days.

(21) Appl. No.: 15/701,086

(22) Filed: Sep. 11, 2017

(65) Prior Publication Data

US 2017/0372675 A1 Dec. 28, 2017

Related U.S. Application Data

(63) Continuation-in-part of application No. 15/614,294, filed on Jun. 5, 2017, now Pat. No. 10,068,548.

(Continued)

(51) Int. Cl.
*G09G 5/10* (2006.01)
*G09G 5/39* (2006.01)
(Continued)

(52) U.S. Cl.
CPC .............. *G09G 5/005* (2013.01); *G09G 5/006* (2013.01); *G09G 5/02* (2013.01); *G09G 5/10* (2013.01);
(Continued)

(58) Field of Classification Search
None
See application file for complete search history.

(56) References Cited

U.S. PATENT DOCUMENTS 5,453,843 A * 9/1995 Levy ........................ G06T 9/005
382/232
6,212,301 B1 * 4/2001 Warner ..................... G06T 9/00
382/232

(Continued)

FOREIGN PATENT DOCUMENTS

EP 2141921 A1 1/2010
JP 2013-061446 A 4/2013

(Continued)

OTHER PUBLICATIONS

Partial European Search Report for European Application No. 18189353.8 dated Oct. 19, 2018; 20 pgs.

(Continued)

*Primary Examiner* — Aaron M Richer
(74) *Attorney, Agent, or Firm* — Fletcher Yoder P.C.

(57) ABSTRACT

Systems and methods for improving perceived image quality of an electronic display, which includes a display region with a rounded border and a display pixel at a pixel position adjacent the rounded border. A display pipeline communicatively coupled to the electronic display receives first image data that indicates target luminance at the pixel position in a rectangular image frame; determines a gain value associated with the pixel position from a gain map, in which the gain value is inversely proportional to distance between the display pixel and the rounded border; determines second image data that indicates target luminance of the display pixel by processing the first image data based at least in part on the gain value; and outputs the second image data to the electronic display to facilitate displaying a non-rectangular portion of the image frame on the display region.

20 Claims, 19 Drawing Sheets

Related U.S. Application Data

(60) Provisional application No. 62/346,517, filed on Jun. 6, 2016.

(51) Int. Cl.
*G09G 5/02* (2006.01)
*G09G 5/00* (2006.01)
*G06T 5/00* (2006.01)

(52) U.S. Cl.
CPC .............. *G09G 5/39* (2013.01); *G06T 5/002* (2013.01); *G06T 2207/20024* (2013.01); *G09G 2310/0232* (2013.01); *G09G 2320/0666* (2013.01); *G09G 2320/0673* (2013.01)

(56) References Cited

U.S. PATENT DOCUMENTS

| | | | |
|---|---|---|---|
| 9,311,735 B1* | 4/2016 | Amirghodsi | G06T 11/60 |
| 10,102,790 B2 | 10/2018 | Yoon et al. | |
| 2005/0225563 A1 | 10/2005 | Brown Elliott et al. | |
| 2010/0045695 A1 | 2/2010 | Brown Elliott et al. | |
| 2014/0181052 A1* | 6/2014 | Moore | G06F 16/2365 |
| | | | 707/687 |
| 2016/0277722 A1 | 9/2016 | Guo et al. | |
| 2017/0061843 A1* | 3/2017 | Zhao | G09G 3/2003 |
| 2017/0092174 A1 | 3/2017 | Cote et al. | |
| 2017/0162103 A1 | 6/2017 | An et al. | |
| 2017/0330500 A1* | 11/2017 | Yoon | G09G 3/2003 |
| 2018/0357979 A1 | 12/2018 | Nakamura et al. | |

FOREIGN PATENT DOCUMENTS

| | | |
|---|---|---|
| KR | 10-2017-129314 A | 11/2017 |
| WO | 2017/110721 A | 10/2018 |

OTHER PUBLICATIONS

Messing et al, "Subpixel rendering on nonstriped colour matrix displays", Image Processing, 2003. ICIP 2003. Proceedings. 2003 International Conference on Image Processing (Cat. No. 03CH37429) vol. 3 Sep. 14-17, 2003.

Office Action for Korean Application No. 10-2018-0098520 dated Jul. 29, 2019; 16 pgs.

Japanese Office Action for Japanese Application No. 2018-161252 dated Oct. 7, 2019; 3 pgs.

* cited by examiner

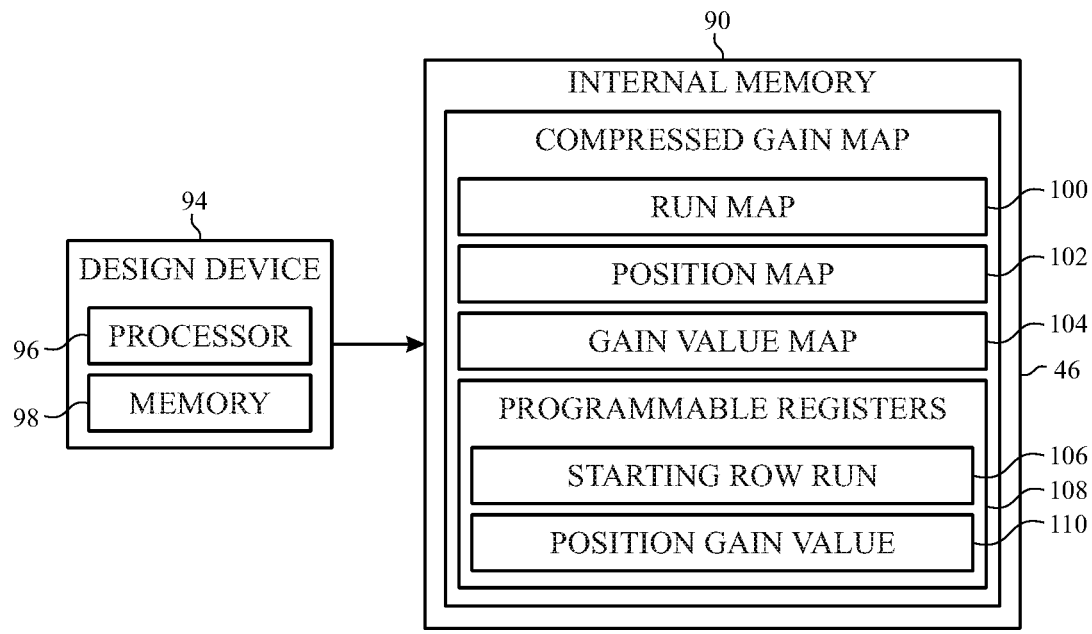
FIG. 9
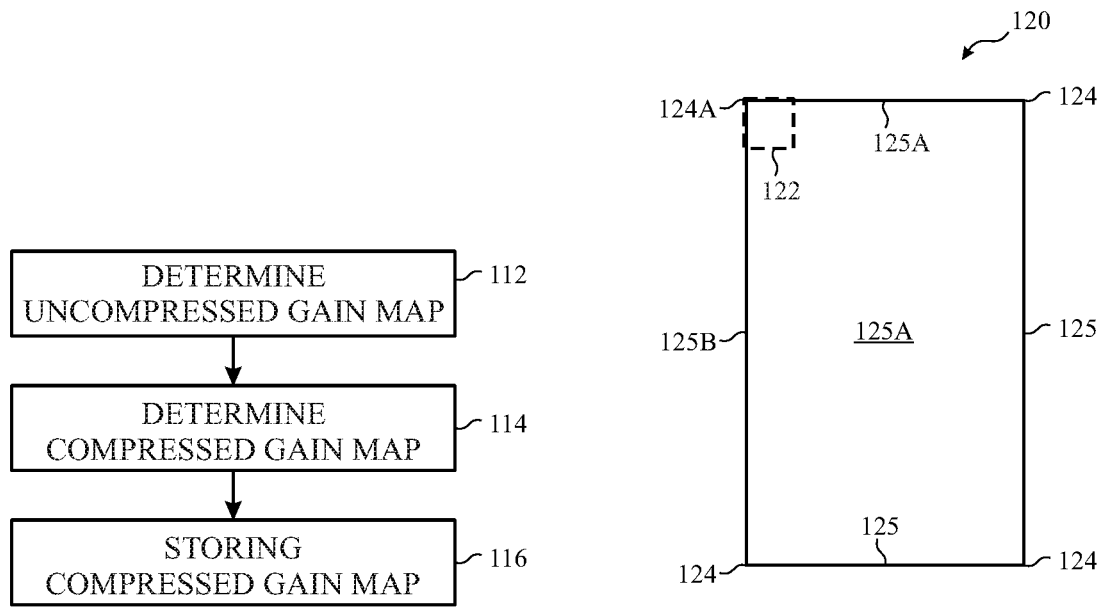
FIG. 10
FIG. 11

ELECTRONIC DISPLAY BORDER GAIN SYSTEMS AND METHODS

CROSS-REFERENCE TO RELATED APPLICATIONS

This application is a continuation-in-part of U.S. patent application Ser. No. 15/614,294 filed Jun. 5, 2017, which claims priority to U.S. Provisional Patent Application No. 62/346,517 filed Jun. 6, 2016, each of which is herein incorporated in its entirety for all purposes.

BACKGROUND

The present disclosure relates generally to electronic displays and, more particularly, to gain applied to display an image or image frame on an electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use electronic displays to provide visual representations of information by displaying one or more images. Such electronic devices may include computers, mobile phones, portable media devices, tablets, televisions, virtual-reality headsets, and vehicle dashboards, among many others. To display an image, an electronic display may control light emission from display pixels based at least in part on image data, which indicates target characteristics of the image. For example, image data may indicate target luminance of specific color components, such as a green component, a blue component, and/or a red component, at various points (e.g., image pixels) in the image.

Relying on blending (e.g., averaging) of the color components, the electronic display may enable perception of various colors in the image. For example, blending the green component, the blue component, and the red components at various luminance levels may enable perception of a range of colors from black to white. To facilitate controlling luminance of the color components, each display pixel in the electronic display may include one or more sub-pixels, which each controls luminance of one color component. For example, a display pixel may include a red sub-pixel, a blue sub-pixel, and/or a green sub-pixel.

In some instances, image data corresponding with an image to be displayed on an electronic display may be generated by an image data source. Since electronic displays often have a rectangular shape, the image data source may generate image data corresponding to a rectangular image. However, in some instances, an electronic display may be implemented with a non-rectangular display region. Nevertheless, to facilitate operational flexibility, the image data source may generate the image data, for example, with little or no consideration of display region shape implemented in an electronic display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving perceived image quality on an electronic display. To display an image, the electronic display may control light emission from its display pixels based at least in part on image data that indicates target characteristics (e.g., luminance) at image pixels in the image. In some instances, the image data may be generated by an image data source.

Since electronic displays often have a rectangular display region, the image data source may generate image data corresponding with a rectangular image. However, in some embodiments, the electronic display may be implemented with a non-rectangular display region, for example, with one or more rounded (e.g., curved) borders. Thus, in some embodiments, a display pipeline may adjust the rectangular image frame for display on the non-rectangular display region, for example, by applying a black mask at pixel positions outside the display region. However, in some instances, merely applying a black mask may result in perceivable visual artifacts, such as color fringing along a border of the display region and/or aliasing along a rounded border of the display region.

To facilitate improving perceived image quality, image data may be processed based at least in part on gain values associated with a pixel position of each image pixel in the image. When a pixel position is within the display region, a corresponding display pixel may be located at the pixel position. In some embodiments, since a display pixel may include multiple sub-pixels, a pixel position may include multiple sub-pixel positions each associated with a corresponding gain value.

In any case, in some embodiments, the display pipeline may apply programmable border gain values at pixel positions adjacent borders of the display region. By applying a corresponding programmable border gain value, display pixels adjacent a border may be dimmed to reduce likelihood of producing perceivable color fringing along the border when the image is displayed.

Additionally or alternatively, the display pipeline may determine gain values associated with pixel positions in anti-aliasing regions along rounded borders of the display region. In some embodiments, a gain value associated with a pixel position located in an anti-aliasing region may be determined based at least in part on distance between the pixel position and a corresponding rounded border. For example, a gain value associated with the pixel position may be inversely proportional to the shortest distance between a corresponding sub-pixel position and the rounded border. By applying such gain values, display pixels adjacent a rounded border may be dimmed to reduce likelihood of producing perceivable aliasing along the rounded border when the image is displayed.

In some embodiments, gain values associated with each pixel position may be indicated via a gain map. For example, an uncompressed gain map may explicitly associate (e.g., map) each pixel position to a gain value set. As such, size of an uncompressed gain map may be relatively large and, thus, stored in external memory.

However, in some instances, accessing the gain values from external memory may affect processing efficiency and/or implementation associated cost, such as size (e.g., hardware footprint) of the display pipeline. To facilitate improving processing efficiency and/or reducing implementation associated cost, in some embodiments, a compressed gain map may be determined based on a corresponding uncompressed gain map. Due to compression, size of the compressed gain map is generally smaller, which may enable storing the compressed gain map in internal memory of the display pipeline. Thus, in such embodiments, accessing external memory to determine the gain values may be obviated, thereby improving processing efficiency and/or reducing direct memory access implementation associated cost.

In some embodiments, a compressed gain map may include a run map, a position map, and a gain value map. The run map may indicate number of gain map rows of the uncompressed gain map included in each row run. Thus, to facilitate determining the run map, each gain map row may be categorized as either a coded row or an uncoded row and one or more consecutive gain map rows with the same row categorization may be grouped into a row run.

Additionally, the position map may indicate pixel positions included in gain runs of each coded row. In some embodiments, the pixel positions included in a gain run may be indicated based at least in part on number of pixel positions in each gain run of a corresponding coded row. Thus, to facilitate determining the position map, each gain map entry in a coded row may be categorized as a unity gain map entry, a zero gain map entry, or an intermediate gain map entry and one or more consecutive gain map entries with the same entry categorization may be grouped into a gain run. To facilitate improving compression efficiency, in some embodiments, the position map may indicate pixel positions in a gain run relative to pixel positions in another gain run. Additionally, in some embodiments, the position map may be entropy encoded to facilitate further improving compression efficiency.

Furthermore, the gain value map may indicate gain values associated with pixel positions in each intermediate gain run. To facilitate improving compression efficiency, in some embodiments, the gain value map may indicate a gain value associated with a pixel position relative to a gain value associated with another (e.g., neighbor) pixel position. Additionally, in some embodiments, the gain value map may be entropy encoded to facilitate further improving compression efficiency.

When indicated via a compressed gain map, the display pipeline may read the compressed gain map to determine gain values associated with each pixel position, for example, by decompressing into a corresponding uncompressed gain map. In some embodiments, the display pipeline may determine row categorization of a gain map row that includes a pixel position by reading the run map. Additionally, when the gain map row is categorized as an uncoded row, the display pipeline may determine that a gain value associated with the pixel position is unity.

On the other hand, when the gain map row is categorized a coded row, the display pipeline may determine pixel positions included in each gain run in the coded row by reading the position map. In other words, the display pipeline may determine entry categorization of each gain map entry in the gain map row based at least in part on the position map. When entropy encoded, the display pipeline may entropy decode the position map.

When a gain map entry corresponding with the pixel position is categorized as a unity gain map entry, the display pipeline may determine that the gain value associated with the pixel position is unity. Additionally, when the gain map entry corresponding with the pixel position is categorized as a zero gain map entry, the display pipeline may determine that the gain value associated with the pixel position is zero. Furthermore, when the gain map entry corresponding with the pixel position is categorized as an intermediate gain map entry, the display pipeline may determine the gain value associated with the pixel position by reading the gain value map. When entropy encoded, the display pipeline may entropy decode the gain value map.

As described above, in some embodiments, a compressed gain map may indicate gain values associated with a pixel position in a relative manner, for example, relative another pixel position. In such embodiments, the display pipeline may experience data dependencies when decompressing a compressed gain map, thereby limiting decompression efficiency (e.g., rate with which gain values associated with a pixel position are determined).

To facilitate improving decompression efficiency, in some embodiments, pixel positions and associated gain values may be grouped into multiple pixel regions, for example, by dividing an uncompressed gain map into multiple uncompressed gain maps. By compressing each uncompressed gain map, multiple compressed gain maps each corresponding to one of the pixel regions may be determined. In this manner, data dependencies between gain values associated with pixel positions in different pixel regions may be reduced. In fact, implementing multiple compressed gain maps in this manner may enable the display pipeline to vary order with which gain values are determined and, thus, access (e.g., fetch) pattern to the compressed gain maps. In some embodiments, the display pipeline may control gain value determination order to improve memory access efficiency, for example, by implementing a random access pattern.

BRIEF DESCRIPTION OF THE DRAWINGS

Various aspects of this disclosure may be better understood upon reading the following detailed description and upon reference to the drawings in which:

FIG. 9 is a block diagram of a design device and the internal memory of FIG. 8, in accordance with an embodiment;

FIG. 10 is a flow diagram of a process for operating the design device of FIG. 10, in accordance with an embodiment;

FIG. 11 is a diagrammatic representation of a rectangular image frame, in accordance with an embodiment;

DETAILED DESCRIPTION

Figure 1:
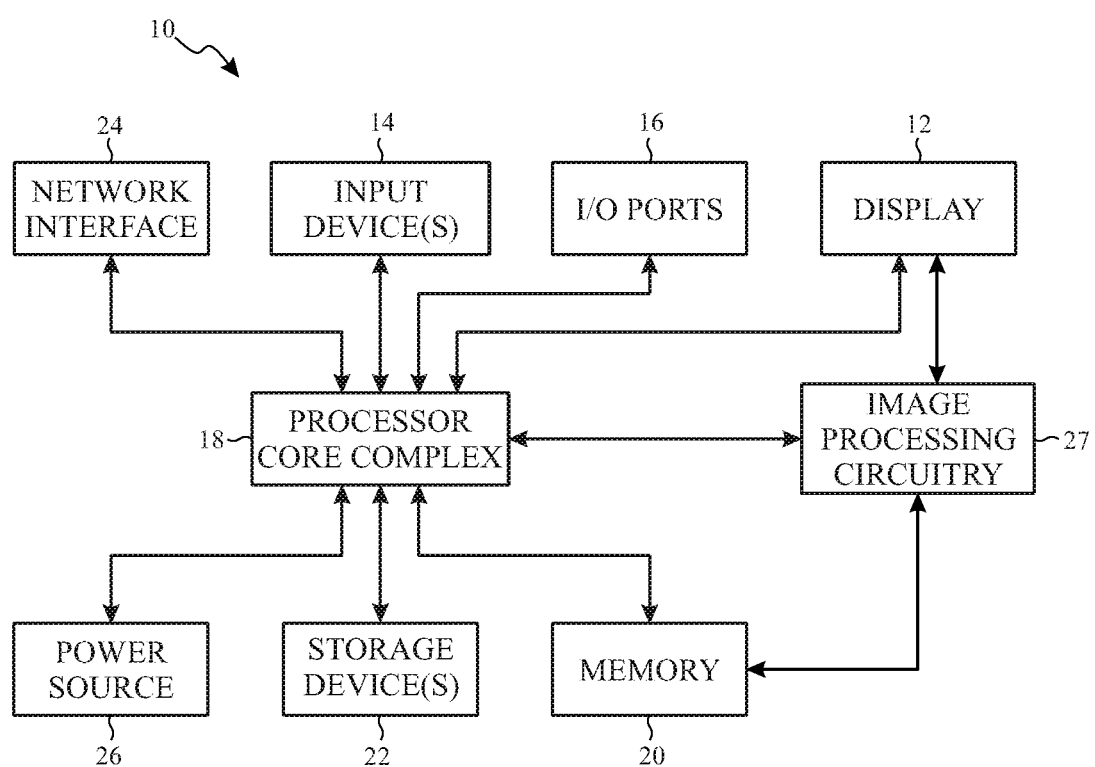
FIG. 1 is a block diagram of an electronic device including an electronic display to display images, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be used to present visual representations of information, for example, as images in one or more image frames. To display an image, an electronic display may control light emission from its display pixels based at least in part on image data that indicates target characteristics of the image. For example, the image data may indicate target luminance (e.g., brightness) of specific color components in a portion (e.g., image pixel) of the image, which when blended (e.g., averaged) together may result in perception of a range of different colors.

Generally, each display pixel in the electronic display may correspond with an image pixel in an image to be displayed. In other words, a display pixel and an image pixel may correspond to a pixel position. To facilitate displaying the image, a display pixel may include one or more sub-pixels, which each controls luminance of one color component at the pixel position. For example, the display pixel may include a red sub-pixel that controls luminance of a red component, a green sub-pixel that control luminance of a green component, and/or a blue sub-pixel that controls luminance of a blue component.

However, different electronic displays may implement different sub-pixel layouts. In some instances, the number of sub-pixels per display pixel in different electronic displays may vary. For example, in a first electronic display, each display pixel may include three sub-pixels. On the other hand, in a second electronic display, each display pixel may include two sub-pixels. Moreover, display pixels in other electronic displays may include any suitable number of sub-pixels, for example, between one sub-pixel per display pixel to five or more sub-pixels per display pixel.

Additionally, in some instances, the color components of sub-pixels implemented in display pixels of different electronic displays may vary. For example, in the first electronic display, each display pixel may include a red sub-pixel, a green sub-pixel, and a blue sub-pixel. On the other hand, in the second electronic display, some (e.g., approximately half) of the display pixels may each include a green sub-pixel and a red sub-pixel while the other display pixels each include a green sub-pixel and a blue sub-pixel. Moreover, display pixels in other electronic displays may include any suitable combination of color component sub-pixels, for example, with multiple sub-pixels of the same color component per display pixel.

Furthermore, in some instances, location of the sub-pixels within display pixels of different electronic displays may vary. For example, in the first electronic display, space (e.g., distance) between the sub-pixels may be smaller. As such, perceivability of the space may be lower and, thus, the sub-pixels in a display pixel may generally be considered as co-located. On the other hand, in the second electronic display, space between the sub-pixels may be larger due to each sub-pixel acting more like a point source. As such, perceivability of the space may be higher and, thus, the sub-pixels in a display pixel of the second electronic display may generally be considered as offset from one another. For example, a display pixel in the second electronic display may include a first sub-pixel co-located with a corresponding image pixel and a second subpixel offset from the corresponding image pixel.

Moreover, in some instances, sub-pixels in different electronic displays may be implemented to result in display regions with varying shapes. For example, the first electronic display may be implemented with a first display region that has rectangular shape. In other words, the first display region may have four straight borders connected at approximately ninety degree corners. On the other hand, the second electronic display may be implemented with a second a display region that has a non-rectangular shape. For example, the second display region may have four straight borders connected with four rounded (e.g., curved) borders.

In some instances, an image data source may generate image data corresponding with image pixels of an image to be displayed. Since electronic displays often have a rectangular display region, the image data source may generate image data corresponding with a rectangular image. As such, each image pixel in the rectangular image may correspond with a display pixel in the first electronic display since the first display region has a rectangular shape. In other words, each pixel position may correspond with both an image pixel and a display pixel.

However, since implemented with a non-rectangular shape, some image pixels in the rectangular image may correspond to a pixel position outside the second display region of the second electronics display. For example, when a top border of the rectangular image is aligned with a top border of the second display region and a left border of the rectangular image is aligned with a left border of the second display region, an image pixel at the top left corner of the rectangular image may correspond to a pixel position outside a top-left rounded border (e.g., corner) of the second display region.

Nevertheless, to improve operational flexibility, the image data source may output the same image data with little or no consideration of an electronic display's sub-pixel layout. For example, the image data source may output image data corresponding with a rectangular image regardless of whether the image is to be displayed on the first electronic display or the second electronic display. However, in some instances, perceived image quality may be affected by sub-pixel layout of an electronic display. For example, the sub-pixel layout of the second electronic display may result in perceivable color fringing along borders (e.g., top straight border, bottom straight border, left straight border, and/or right straight border) of the second display region. Additionally or alternatively, the sub-pixel layout of the second electronic display may result in perceivable aliasing along rounded (e.g., top-left, top-right, bottom-left, and/or bottom-right) borders of the display region.

Accordingly, the present disclosure provides techniques for improving perceived image quality of an electronic display, for example, by processing image data based at least in part on sub-pixel layout of the electronic display. In some embodiments, a display pipeline may receive and process image data generated by an image data source before a corresponding image is displayed on the electronic display. For example, the display pipeline may processes image data in a source (e.g., RGB) format to determine image data in a display (e.g., GR or GB) format. More specifically, in some embodiments, the display pipeline may determine display pixel image data (e.g., image data corresponding with a display pixel) by filtering (e.g., interpolating or sampling) and applying gain values to image pixel image data (e.g., image data corresponding with an image pixel).

In some embodiments, the display pipeline may determine the display pixel image data by filtering the image pixel image data based at least in part on surrounding image pixel image data. For example, the display pipeline may determine offset sub-pixel image data (e.g., image data corresponding with an offset sub-pixel) by applying a low pass filter that equally averages corresponding color component image data of surrounding image pixels. Since offset from the surrounding image pixels, determining the offset sub-pixel image data in this manner may result in a more gradual luminance change.

However, due at least in part to sub-pixel layout of the electronic display, the more gradual luminance change, in some instances, may result in perceivable visual artifacts, such as color fringing along a borders of a display region and/or aliasing along a rounded border of the display region. For example, when display pixels have a co-located green sub-pixel, green color fringing may be perceivable along a first (e.g., top or bottom) straight border of the display region. Additionally, when display pixels have alternatingly either an offset red sub-pixel or an offset blue sub-pixel, violet color fringing may be perceivable along a second (e.g., left or right) straight border of the display region. Furthermore, when display pixels have an offset sub-pixel, aliasing (e.g., jaggedness) may be perceivable along a rounded (e.g., top-left, top-right, bottom-left, or bottom-right) border of the display region.

To reduce likelihood of producing perceivable visual artifacts, in some embodiments, the display pipeline may determine display pixel image data by applying gain values after filtering image pixel image data to dim sub-pixels along borders of the display region. For example, to reduce likelihood of producing perceivable color fringing, the display pipeline may apply intermediate gain values (e.g., greater than zero and less than unity) to dim sub-pixels in display pixels along borders (e.g., straight borders) of the display region. Additionally, to reduce likelihood of producing perceivable aliasing, the display pipeline may apply intermediate gain values to dim sub-pixels in display pixels along rounded borders of the display region.

In some embodiments, the gain value to be applied at a sub-pixel in a display pixel along a rounded border may be determined based at least in part on distance between the sub-pixel and the rounded border. For example, an anti-aliasing region including sub-pixel positions along the rounded border may be determined. Additionally, the gain value associated with each sub-pixel position in the anti-aliasing region may be inversely proportional to the shortest distance between the sub-pixel position and the rounded border. By applying gain values determined in this manner, sub-pixels along the rounded border may be linearly dimmed based at least in part on sub-pixel layout of the electronic display to reduce likelihood of producing perceivable aliasing along the rounded border.

Additionally, the gain value corresponding with pixel positions outside the display region of the electronic display and the anti-aliasing region may be set to zero. By applying gain values determined in this manner, a black mask may be applied to black out image data corresponding with pixel positions outside the display region. In this manner, a rectangular image may be adjusted to facilitate display on an electronic display with a non-rectangular display region. To facilitate further improving perceived image quality, in some embodiments, the display pipeline may adaptively adjust filtering parameters (e.g., filter phase or filter coefficients) applied to image pixel image data based at least in part on gain values associated with a corresponding pixel position and/or gain values associated with neighboring pixel positions.

In some embodiments, the display pipeline may calculate gain values associated with a pixel position while processing corresponding image pixel image data. Additionally, in some embodiments, the gain value to be applied at display pixels along a border of the display region may be stored in a programmable register. For example, a first border gain value to be applied at display pixels along a top straight border may be stored in a first programmable register, a second border gain value to be applied at display pixels along a bottom straight border may be stored in a second programmable register, a third gain value to be applied at display pixels along a left straight border may be stored in a third programmable register, and a fourth gain value to be applied at display pixels along a right straight border may be stored in a fourth programmable register.

Furthermore, in some embodiments, gain values associated with a pixel positon may be predetermined since characteristics (e.g., resolution, sub-pixel layout, and/or display region shape) of electronic displays are generally fixed. For example, a design device may determine and store the gain values as a gain map, which indicates a set of gain values associated with each pixel position. In some embodiments, the gain value set associated with a pixel position may include a gain value for each color component in a corresponding display pixel. For example, when the display pixel includes a red sub-pixel and a green sub-pixel, the gain value set associated with its pixel position may include a red gain value and a green gain value. Additionally, when the display pixel includes a blue sub-pixel and a green sub-pixel, the gain value set associated with its pixel position may include a blue gain value and a green gain value.

In some embodiments, an uncompressed gain map may explicitly associate (e.g., map) each pixel position to a corresponding gain value set. In other words, number of entries in the uncompressed gain map may be greater than or equal to resolution of the electronic display. As such, size (e.g., number of bits) of the uncompressed gain map may be relatively large—particular as resolution of electronic displays continue to increase. To accommodate its size, in some embodiments, the uncompressed gain map may be stored in external memory and, thus, retrieved from the external memory by the display pipeline via a direct memory access (DMA) channel. However, accessing external memory via a direct memory access channel may affect processing efficiency and/or implementation associated cost, such as power consumption and/or size (e.g., hardware footprint) of the display pipeline.

To facilitate improving processing efficiency and/or reducing implementation associated cost, in some embodiments, a compressed gain map may be used to indicate the gain values. For example, the design device may compress an uncompressed gain map to determine a compressed gain map. Due to compression, size of the compressed gain map is generally smaller than the uncompressed gain map. In some embodiments, the reduced size may enable storing the compressed gain map in internal memory of the display pipeline. Thus, in such embodiments, accessing external memory to determine the gain values may be obviated, thereby improving processing efficiency and/or reducing direct memory access implementation associated cost.

To facilitate compression, in some embodiments, each gain map row in the uncompressed gain map may be categorized as either an uncoded row or a coded row based at least in part on gain values indicated by its corresponding gain map entries. For example, the design device may categorize a gain map row as an uncoded row when each gain value indicated by the gain map row is unity. On the other hand, the design device may categorize a gain map row as a coded row when one or more gain value indicated by the gain map row is less than unity. In other words, a gain value in a coded row may be zero, unity, or an intermediate gain value (e.g., greater than zero and less than unity).

Additionally, based on row categorization, each gain map row may be grouped into a row run. For example, the design device may group one or more consecutive coded rows into a coded row run. Additionally, the design device may group one or more consecutive uncoded rows into an uncoded row run. In some embodiments, the row runs may alternate between coded row runs and uncoded row runs.

Furthermore, gain map entries in each coded row may be grouped into a gain run. For example, the design device may group one or more consecutive gain map into an intermediate gain run when each gain map entry indicates at least one intermediate gain value. Additionally, the design device may group one or more consecutive gain map entries into a zero gain run when each gain value indicated by the gain map entries is zero. Furthermore, the design device may group one or more consecutive gain map entries into a unity gain run when each gain value indicated by the gain map entries is unity. In some embodiments, the gain runs in a coded row may alternate between position (e.g., zero or unity) gain runs and intermediate gain runs.

Additionally, in some embodiments, a compressed gain map may includes a run map, a position map, a gain value map, and one or more indicators, for example, stored in programmable registers of the internal memory. The run map may indicate number of gain map rows in each row run and, thus, determined based at least in part on grouping of the gain map rows into row runs. In some embodiments, each run map entry may explicitly indicate number of gain map rows in a corresponding row run. For example, when a first row run includes the first ten gain map rows and a second row run includes the next five gain map rows, the design device may indicate a value of ten in a first run map entry and a value of five in a second run map entry.

Additionally, in some embodiments, a starting row run indicator may indicate whether the first row run identified in the uncompressed gain map is a coded row run or an uncoded row run. For example, when the first row run is an uncoded row run, the design device may indicate a first value (e.g., 0 bit) in the starting row run indicator. On the other hand, when the first row run is a coded row run, the design device may indicate a second value (e.g., 1 bit) in the starting row run indicator.

The position map may indicate pixel positions associated with gain runs in each coded row. In some embodiments, each position map entry may indicate the pixel positions associated with a gain run by explicitly indicating number of gain map entries included in the gain run. For example, when a first gain run includes the first four gain map entries of a gain map row and a second gain run includes the next six gain map entries of the gain map row, the design device may indicate a value of four in a first position map entry and a value of six in a second run map entry.

To facilitate improving compression efficiency, in other embodiments, each position map entry may indicate the pixel positions in a gain run relative to pixel positions in another gain run. For example, when a first gain run includes the first four gain map entries of a first gain map row and a second gain run includes the first five gain map entries of a second gain map row, the design device may determine a pixel position difference of positive one since the second gain run includes one more pixel position than the first gain run. To indicate the positive one position difference, the design device may indicate a first value (e.g., 0 bit) in a first position map entry and a value of one in a second position map entry. Additionally, when a third gain run includes the next six gain map entries of the first gain map row and a fourth gain run includes the next five gain map entries of the second gain map row, the design device may determine a pixel position different of negative one since the fourth gain run includes one less pixel position than the third gain run. To indicate the negative one position difference, the design device may indicate a second value (e.g., 1 bit) in a third position map entry and a value of one in a fourth position map entry. In some embodiments, the pixel position differences may be entropy encoded to facilitate further improving compression efficiency.

The gain value map may indicate gain values associated with pixel positions in each intermediate gain run. In some embodiments, gain value map entries may explicitly indicate a gain value associated with a pixel position. For example, when a display pixel includes a first (e.g., green) sub-pixel and a second (e.g., red or blue) sub-pixel, the design device may explicitly indicate a first gain value associated with the first sub-pixel in a first gain value map entry and a second gain value associated with the second sub-pixel in a second gain value map entry. To facilitate improving compression efficiency, some gain value map entries may indicate a gain value associated with a pixel position relative to a gain value associated with another pixel position. For example, when a first gain value associated with a current pixel position is the same as a second gain value associated with a directly previous (e.g., left neighbor) pixel position, the design device may indicate a first value (e.g., 1 bit) in a gain value map entry associated with the current pixel position. On the other hand, when the first gain value and the second gain value are different, the design device may indicate a second value (e.g., 0 bit) in the gain map entry. In some embodiments, explicitly indicated gain values may be entropy encoded to facilitate further improving compression efficiency.

As described above, the display pipeline may process image pixel image data based at least in part on gain values associated with a corresponding pixel position. Thus, when indicated using a compressed gain map, the display pipeline may decompress the compressed gain map to determine gain values (e.g., red gain value, blue gain value, and/or green gain value) associated with one or more pixel positions. In some embodiments, the display pipeline may read the run map (e.g., via a bit stream) and/or a starting row run indicator to determine whether the image pixel image data corresponds to a pixel position in a coded row run or an uncoded row run. In this manner, the display pipeline may determine whether the pixel position is in a coded row or an uncoded row.

As described above, a gain map row may be categorized as an uncoded row when each of the gain values indicated by its gain map entries are equal to unity. Thus, when the display pipeline determines that a pixel position is in an uncoded row, the display pipeline may determine that each gain value associated with the pixel position is equal to unity. Additionally, as described above, a gain map row may be categorized as a coded row when one or more gain values indicated by its gain map entries are less than unity. Thus, when the display pipeline determines that a pixel position is in a coded row, the display pipeline may read the position map (e.g., via a bit stream) to determine whether the pixel position is in a position gain run or an intermediate gain run. Additionally, when indicated via entropy encoded pixel position differences, the display pipeline may entropy decode the position map to determine a pixel position difference and determine pixel positions in a gain run by applying the pixel position difference relative to another gain run, for example, in a top neighbor gain map row.

As described above, one or more consecutive gain map entries may be categorized as an intermediate gain run when each gain map entry includes at least one intermediate gain value (e.g., greater than zero and less than unity). Thus, when the display pipeline determines that a pixel position is in an intermediate gain run, the display pipeline may read the gain value map (e.g., via a bit stream) to determine a gain value set associated with the pixel position. Additionally, when a gain value is entropy encoded, the display pipeline may entropy decode the gain value map to determine the gain value associated with the pixel position.

As described above, a position gain run may be either a zero gain run or a unity gain run. Thus, when the display pipeline determines that a pixel position is in a position gain run, the display pipeline may read a corresponding position gain value indicator to determine whether the pixel position is in a zero gain run or a unity gain run. Additionally, as described above, one or more consecutive gain map entries may be categorized as a zero gain run when each included gain value is zero. Thus, when a corresponding position gain value indicator indicates that a pixel position is in a zero gain run, the display pipeline may determine that each gain value associated with the pixel position is equal to zero. Furthermore, as described above, one or more consecutive gain map entries may be categorized as a unity gain run when each included gain value is unity. Thus, when a corresponding position gain value indicator indicates that a pixel position is in a unity gain run, the display pipeline may determine that each gain value associated with the pixel position is equal to unity.

Based at least in part on the gain values, the display pipeline may process image pixel image data to determine display pixel image data, which may be used to display a corresponding image on an electronic display. For example, by applying the gain values, the display pipeline may apply a black mask that adjusts a rectangular image for display on a non-rectangular display region. Additionally, the display pipeline may adaptively (e.g., dynamically) adjust filter parameters based at least in part on the gain values to improve sharpness along edges (e.g., sharp gradient transitions) in an image. Furthermore, by applying the gain values, the display pipeline may dim display pixels along a display region border to reduce likelihood of producing perceivable visual artifacts (e.g., aliasing and/or fringing) along the display region border. In this manner, the display pipeline may process image data based at least in part on the gain values determined from a (e.g., compressed or uncompressed) gain map before a corresponding image is displayed on an electronic display to improve perceived image quality of the electronic display.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

In the depicted embodiment, the electronic device 10 includes the electronic display 12, input devices 14, input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally, the image processing circuitry 27 (e.g., a graphics processing unit) may be included in the processor core complex 18.

As depicted, the processor core complex 18 is operably coupled with local memory 20 and the main memory storage device 22. In some embodiments, the local memory 20 and/or the main memory storage device 22 may be tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and the like.

In some embodiments, the processor core complex 18 may execute instruction stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

As depicted, the processor core complex 18 is also operably coupled with the network interface 24. Using the network interface 24, the electronic device 10 may be communicatively coupled to a network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

Additionally, as depicted, the processor core complex 18 is operably coupled to the power source 26. In some embodiments, the power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

Furthermore, as depicted, the processor core complex 18 is operably coupled with I/O ports 16 and the input devices 14. In some embodiments, the I/O ports 16 may enable the electronic device 10 to interface with various other electronic devices. Additionally, in some embodiments, the input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying images (e.g., in one or more image frames). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27.

Figure 2:
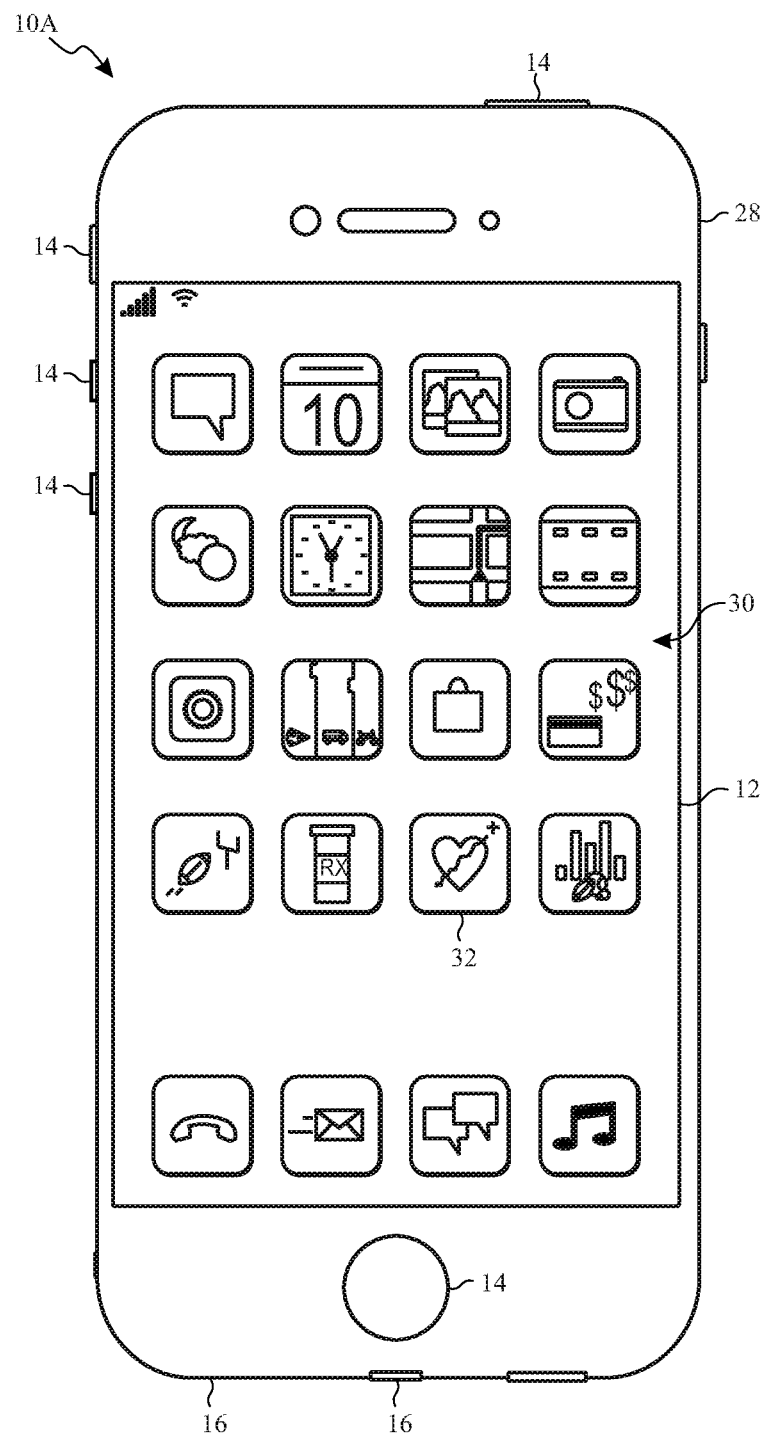
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
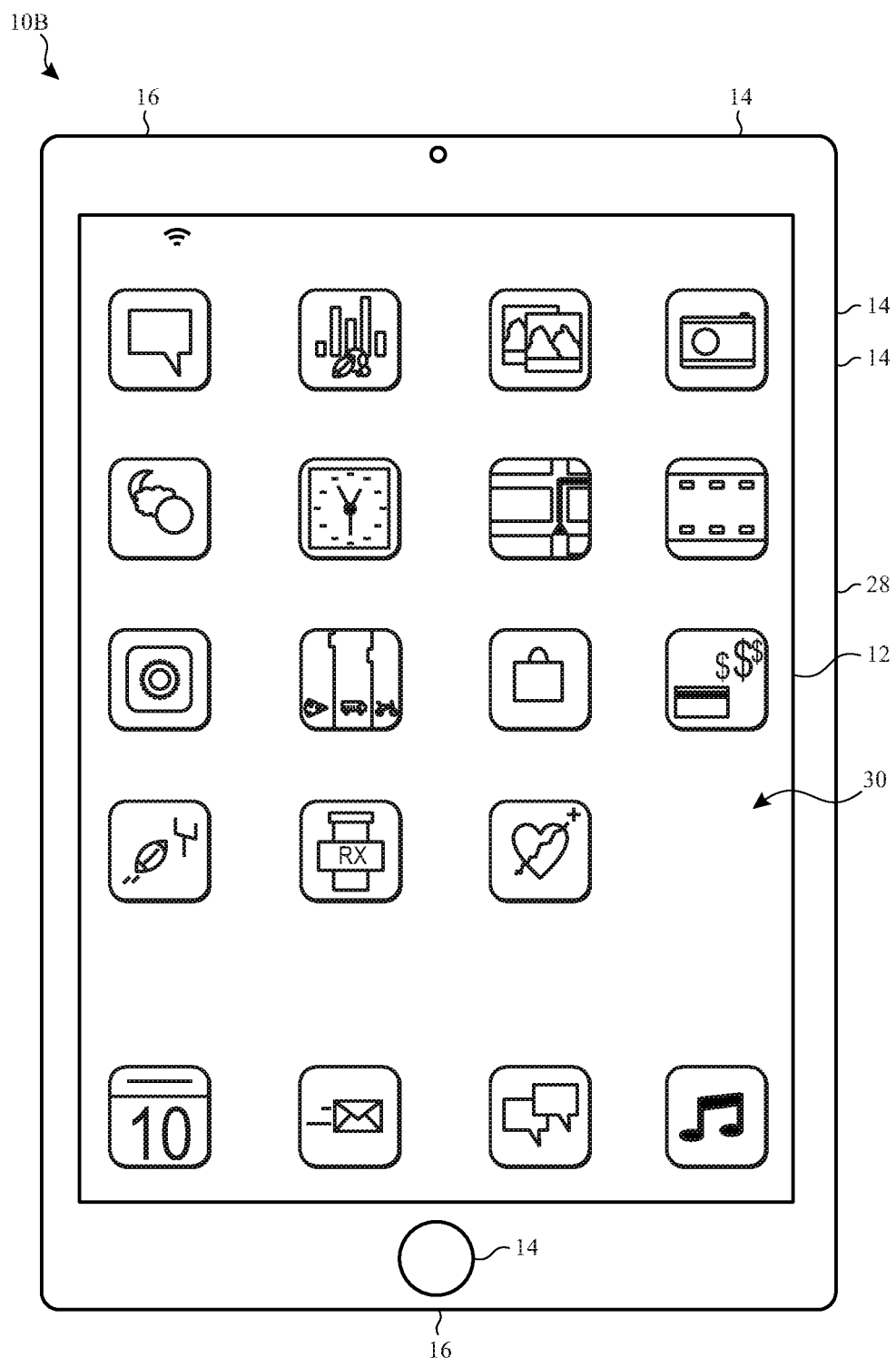
FIG. 3 is another example of the electronic device of FIG. 1, in accordance with an embodiment.
Figure 4:
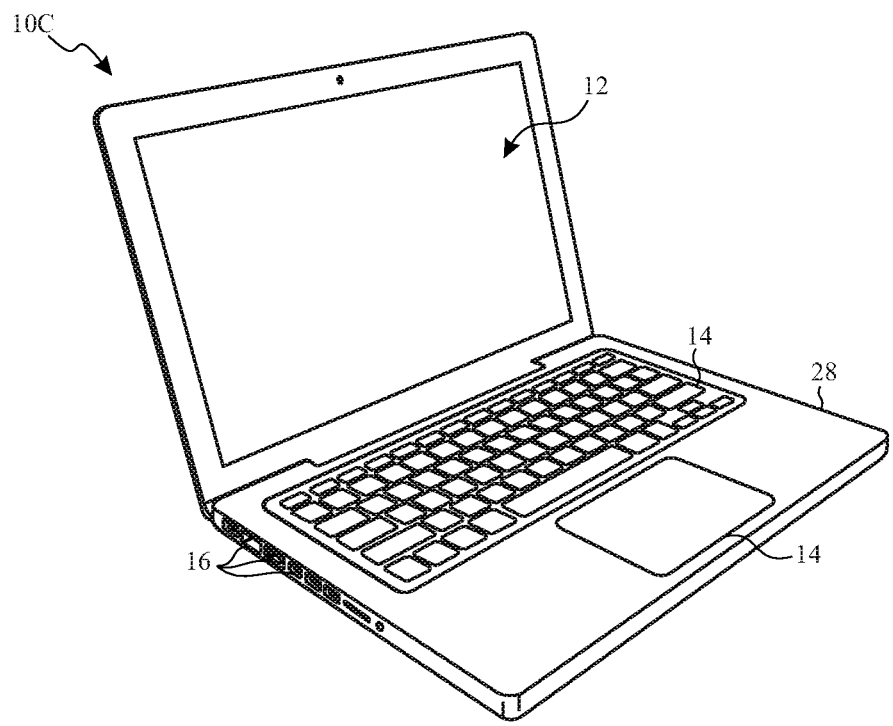
FIG. 4 is another example of the electronic device of FIG. 1, in accordance with an embodiment.
Figure 5:
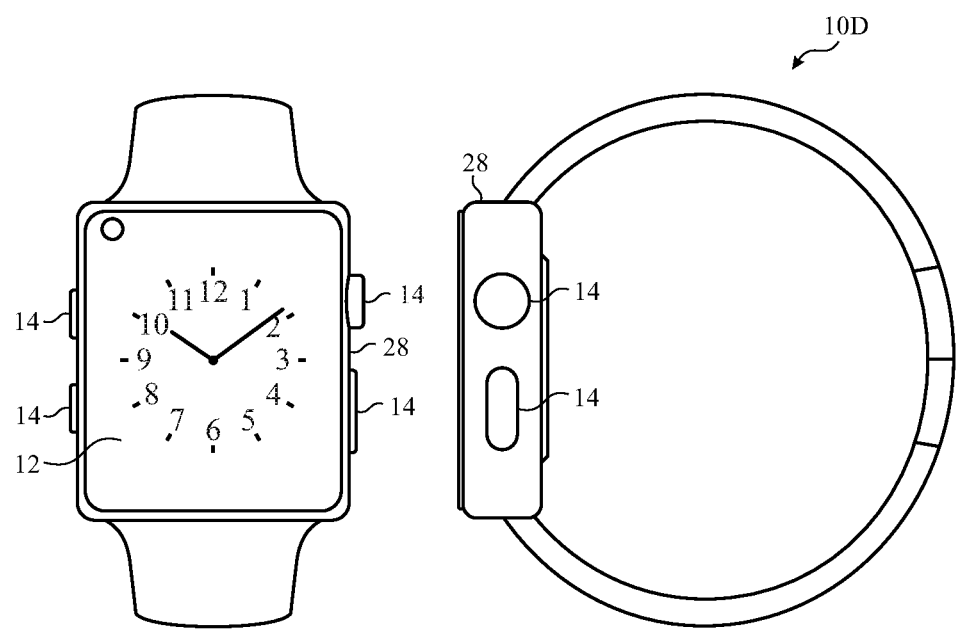
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, the electronic display 12 may display images based at least in part on image data received, for example, from the processor core complex 18 and/or the image processing circuitry 27. Additionally, as described above, the image data may be processed before being used to display an image on the electronic display 12. In some embodiments, a display pipeline may process the image data, for example, based on gain values associated with corresponding pixel position to facilitate improving perceived image quality of the electronic display 12.

Figure 6:
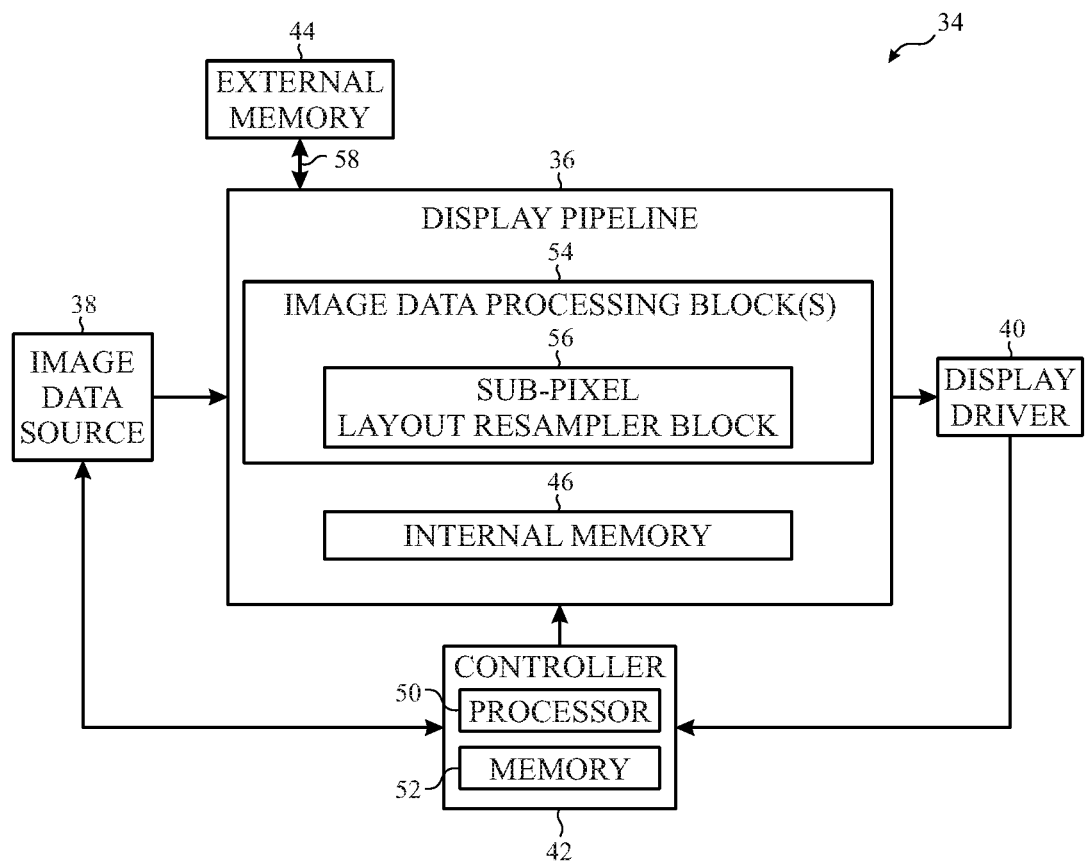
FIG. 6 is a block diagram of a display pipeline implemented in the electronic device of FIG. 1, in accordance with an embodiment.

To help illustrate, a portion 34 of the electronic device 10 including a display pipeline 36 is shown in FIG. 6. In some embodiments, the display pipeline 36 may be implemented by circuitry in the electronic device 10, circuitry in the electronic display 12, or a combination thereof. For example, the display pipeline 36 may be included in the processor core complex 18, the image processing circuitry 27, a timing controller (TCON) in the electronic display 12, or any combination thereof.

As depicted, the portion 34 of the electronic device 10 also includes an image data source 38, a display driver 40, a controller 42, and external memory 44. In some embodiments, the controller 42 may control operation of the display pipeline 36, the image data source 38, and/or the display driver 40. To facilitate controlling operation, the controller 42 may include a controller processor 50 and controller memory 52. In some embodiments, the controller processor 50 may execute instructions stored in the controller memory 52. Thus, in some embodiments, the controller processor 50 may be included in the processor core complex 18, the image processing circuitry 27, a timing controller in the electronic display 12, a separate processing module, or any combination thereof. Additionally, in some embodiments, the controller memory 52 may be included in the local memory 20, the main memory storage device 22, the external memory 44, internal memory 46 of the display pipeline 36, a separate tangible, non-transitory, computer readable medium, or any combination thereof.

In the depicted embodiment, the display pipeline 36 is communicatively coupled to the image data source 38. In this manner, the display pipeline 36 may receive image data corresponding with an image to be displayed on the electronic display 12 from the image data source 38, for example, in a source (e.g., RGB) format and/or as a rectangular image. In some embodiments, the image data source 38 may be included in the processor core complex 18, the image processing circuitry 27, or a combination thereof.

As described above, the display pipeline 36 may process the image data received from the image data source 38. To process the image data, the display pipeline 36 may include one or more image data processing blocks 54. For example, in the depicted embodiment, the image data processing blocks 54 include a sub-pixel layout resampler (SPLR) block 56. In some embodiments, the image data processing blocks 54 may additionally or alternatively include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

As will be described in more detail below, the display pipeline 36 may process the image data received from the image data source 38 based at least in part on data stored in the external memory 44 and/or the internal memory 46. Generally, storing data in the external memory 44 versus the internal memory 46 may present various implementation associated cost and/or processing efficiency tradeoffs. For example, due at least in part to physical sizing constraints, increasing storage capacity of the external memory 44 may be easier than increasing storage capacity of the internal memory 46. As such, storage capacity of the external memory 44 may generally larger than storage capacity of the internal memory 46.

Additionally, access to the external memory 44 and the internal memory 46 may differ. For example, the internal memory 46 may be dedicated for use by the display pipeline 36. In other words, data stored the internal memory 46 more readily accessible by the display pipeline 36, for example, with reduced latency, which may facilitate improving processing efficiency of the display pipeline 36. Comparatively, since external from the display pipeline 36, the display pipeline 36 may access the external memory 44 via a direct memory access (DMA) channel 58. However, to provide data access in this manner, the direct memory access channel 58 may be implemented with increased bandwidth, which increases implementation associated cost. Moreover, when the external memory 44 is shared with other components, data access latency and, thus, processing efficiency of the display pipeline 36 may be affected.

After processing, the display pipeline 36 may output processed image data, such as display pixel image data, to the display driver 40. Based at least in part on the processed image data, the display driver 40 may apply analog electrical signals to the display pixels of the electronic display 12 to display images in one or more image frames. In this manner, the display pipeline 36 may operate to facilitate providing visual representations of information on the electronic display 12.

Figure 7:
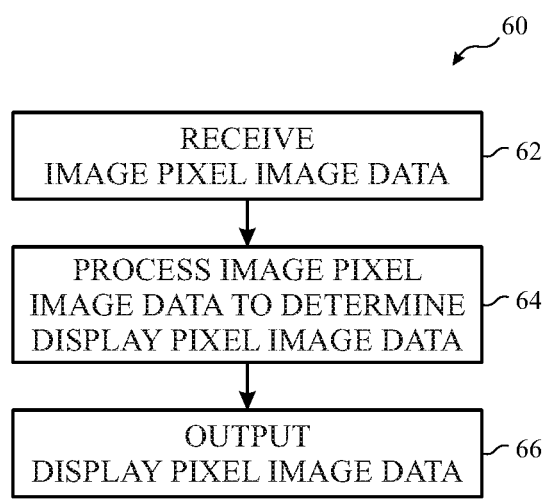
FIG. 7 is a flow diagram of a process for operating the display pipeline of FIG. 6, in accordance with an embodiment.

To help illustrate, one embodiment of a process 60 for operating the display pipeline 36 is described in FIG. 7. Generally, the process 60 includes receiving image pixel image data (process block 62), processing the image pixel image data to determine display pixel image data (process block 64), and outputting the display pixel image data (process block 66). In some embodiments, the process 60 may be implemented based on circuit connections formed in the display pipeline 36. Additionally or alternatively, in some embodiments, the process 60 may be implemented by executing instructions stored in a tangible non-transitory computer-readable medium, such as the controller memory 52, using processing circuitry, such as the controller processor 50.

As described above, the display pipeline 36 may receive image pixel image data, which indicates target luminance of color components at points (e.g., image pixels) in an image, from the image data source 38 (process block 62). In some embodiments, the image pixel image data may correspond to a rectangular image. Additionally, in some embodiments, the image pixel image data may be in a source format. For example, when the source format is an RGB format, image pixel image data may indicate target luminance of a red component, target luminance of a blue component, and target luminance of a green component at a corresponding pixel position.

Additionally, the controller 42 may instruct the display pipeline 36 to process the image pixel image data to determine display pixel image data, which indicates target luminance of color components at display pixels of the electronic display 12, (process block 64) and output the display pixel image data to the display driver 40 (process block 66). To determine the display pixel image data, the display pipeline 36 may convert image data from a source format to a display format. In some embodiments, the display pipeline 36 may determine the display format may be based at least in part on layout of sub-pixels in the electronic display 12. For example, when some display pixels include green and red sub-pixels while other display pixels include green and blue sub-pixels, the display format may be a green-red and green-blue (GRGB) format.

Figure 8:
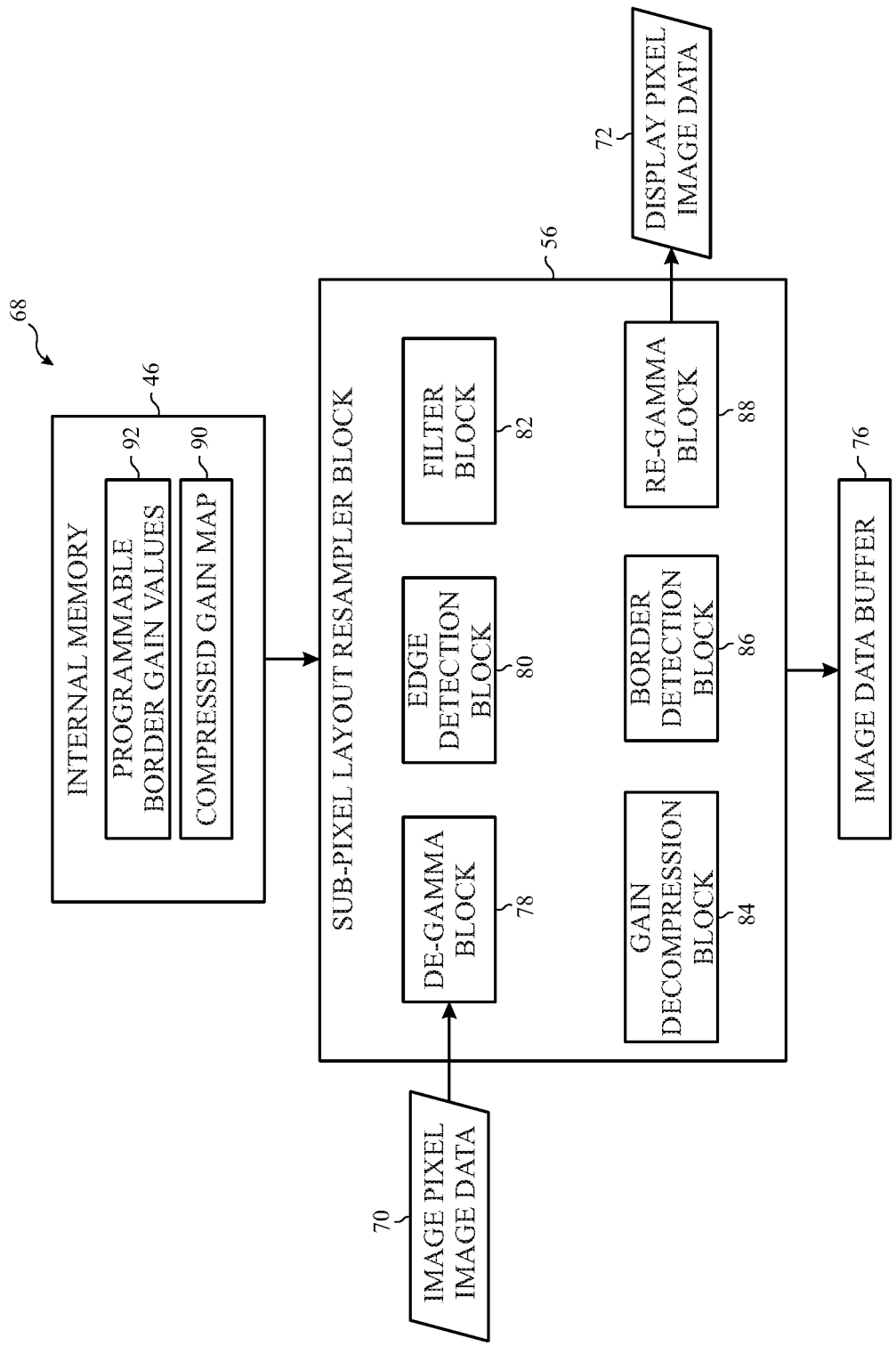
FIG. 8 is a block diagram of a sub-pixel layout resampler block and internal memory in the display pipeline of FIG. 6, in accordance with an embodiment.

To help illustrate, a portion 68 of the display pipeline 36 including the sub-pixel layout resampler block 56 is shown in FIG. 8. As depicted, the sub-pixel layout resampler block 56 receives image pixel image data 70 corresponding with a current image pixel and outputs display pixel image data 72 corresponding with a current display pixel. In some embodiments, the sub-pixel layout resampler block 56 may receive the image pixel image data 70 from another image data processing block 54 and/or from the image data source 38. Additionally, in some embodiments, the sub-pixel layout resampler block 56 may output the display pixel image data 72 to another image data processing block 54 and/or the display driver 40.

To facilitate generating the display pixel image data 72, the sub-pixel layout resampler block 56 may include a de-gamma block 78, an edge detection block 80, a filter block 82, a gain decompression block 84, a border detection block 86, and a re-gamma block 88. In some embodiments, the image pixel image data 70 may be in a gamma (e.g., non-linear) domain. To facilitate subsequent processing, the de-gamma block 78 may convert the image pixel image data 70 to a linear domain.

Additionally, the edge detection block 80 may determine edge parameters, such as likelihood of an edge occurring at an offset sub-pixel of the current display pixel and/or expected direction of the edge at the offset sub-pixel. In some embodiments, the edge detection block 80 may determine edge parameters based at least in part on characteristics of the offset sub-pixel, such as gradient of the area around the offset sub-pixel. To facilitate determining the characteristics, the edge detection block 80 may determine statistics indicative of the characteristics. For example, the edge detection block 80 may determine difference metrics (e.g., sum-of-absolute difference) between image pixel blocks around the offset sub-pixel, which may be indicative of gradient around the offset sub-pixel and, thus, used to determine the edge parameters.

In some embodiments, an image data buffer 76 may store image data corresponding with other image pixels, for example, at pixel positions neighboring the current image pixel. In other words, the frame buffer may store image data corresponding with the image pixel blocks around the offset sub-pixel. Thus, to facilitate determining the edge parameters, the sub-pixel layout resampler block 56 may by communicatively coupled to the image data buffer 76.

Furthermore, the filter block 82 may convert the image pixel image data from the source (e.g., RGB) format to the display (e.g., GRGB) format based at least in part on the edge parameters. To convert into the display format, in some embodiments, the filter block 82 may determine and apply filter parameters to the image pixel image data 70. For example, the filter block 82 may filter (e.g., sample) the image pixel image data 70 in the RGB to generate display pixel image data 72 in the green-red (GR) or the green-blue (GB) format. In other words, the filter block 82 may determine image data corresponding with the offset sub-pixel and image data corresponding with a co-located sub-pixel of the current display pixel.

In some embodiments, the filter block 82 may determine the filter parameters to be applied to the image pixel image data 70 based at least in part on gain values associated with a current pixel position of the current image pixel. Additionally, after filtering, the filter block 82 may apply the gain values associated with the current pixel position to the display pixel image data 72. In some embodiments, the display pipeline 36 may algorithmically calculate the gain values associated with a pixel position.

Additionally or alternatively, the gain values may be predetermined and stored via a gain map. In some embodiments, an uncompressed gain map may explicitly associate (e.g., map) each pixel position with a set of gain values. The set of gain values associated with a pixel position may include one gain value for each sub-pixel of a display pixel at the pixel position. For example, when a display pixel includes a red sub-pixel, a blue sub-pixel, and a green sub-pixel, the set of gain values associated with its pixel position may include a red gain value, a blue gain value, and a green gain value. Additionally, when a display pixel includes a green sub-pixel and a red sub-pixel, the set of gain values associated with its pixel position may include a red gain value and a green gain value. Furthermore, when a display pixel includes a green sub-pixel and a blue sub-pixel, the set of gain values associated with its pixel position may include a blue gain value and a green gain value.

Since an uncompressed gain map associates a gain value set with at least pixel positions corresponding to each display pixel, size of an uncompressed gain map vary based on resolution of the electronic display 12. In other words, size of an uncompressed gain map may be relative large—particularly as resolution of electronic displays continue to increase. Thus, in some embodiments, an uncompressed gain map may be stored in the external memory 44 and accessed via the direct memory access channel 58.

However, as described above, providing the display pipeline 36 access to the external memory 44 may affect implementation associated cost and/or processing efficiency. Thus, in some embodiments, data indicative of the gain values associated with each pixel position may be stored in the internal memory 46. For example, in the depicted embodiment, the internal memory 46 stores a compressed gain map 90, which may be determined by compressing a corresponding uncompressed gain map, and one or more programmable border gain value indicators 92, which each indicate a gain value to be applied at display pixels along a corresponding (e.g., top, bottom, left, or right) display region border.

Thus, to facilitate determining gain values associated with the current pixel position, the gain decompression block 84 may decompress the compressed gain map 90. Additionally, the border detection block 86 may determine whether the current display pixel is along a border of the display region and determine a corresponding one of the programmable border gain value indicators 92 when the current display pixel is along the border. As described above, based at least in part on the gain values, the sub-pixel layout resampler block 56 may process the image pixel image data 70 to determine display pixel image data 72. Since determined in the linear domain, the re-gamma block 88 may convert the display pixel image data 72 to the gamma domain. Additionally, since in the display format, the sub-pixel layout resampler block 56 may upscale the display pixel image data 72 to the source format.

Thus, to facilitate determining the display pixel image data 72, the compressed gain map 90 and the programmable border gain value indicators 92 may be determined and stored in the internal memory 46. In some embodiments, a design device may determine the compressed gain map 90 based at least in part on a corresponding uncompressed gain map. Additionally, in some embodiments, the design device may store the compressed gain map 90 and the programmable border gain value indicators 92 in the internal memory 46 before deployment of the display pipeline 36 and/or the electronic display 12.

To help illustrate, one embodiment of a design device 94 communicatively coupled to the internal memory 46 is shown in FIG. 9. Additionally, one example of a compressed gain map 90 is stored in the internal memory 46. It should be appreciated that the example compressed gain map 90 is merely intended to be illustrative and not limiting. In other words, compressed gain maps 90 in other embodiments may vary, for example, based on compression technique implemented by the design device 94.

As described above, the design device 94 may determine and store the compressed gain map 90 in the internal memory 46. To facilitate determining the compressed gain map 90, the design device 94 may include a device processor 96 and device memory 98. In some embodiments, the device processor 96 may execute instructions stored in the device memory 98. Thus, in some embodiments, the device processor 96 may be included in the processor core complex 18, the image processing circuitry 27, a timing controller in the electronic display 12, the controller processor 50, a separate processing module, or any combination thereof. Additionally, in some embodiments, the device memory 98 may be included in the local memory 20, the main memory storage device 22, the external memory 44, the internal memory 46, the controller memory 52, a separate tangible, non-transitory, computer readable medium, or any combination thereof.

In the depicted embodiment, the compressed gain map 90 includes a run map 100, a position map 102, a gain value map 104, and one or more indicators 106, which may be stored in programmable registers 106 of the internal memory 46. In some embodiments, the run map 100 may indicate number of gain map rows and, thus, pixel position rows included in each row run. As will be described in more detail below, one or more consecutive gain map rows, which each include only unity gain values, may be grouped into an uncoded row run. Additionally, one or more consecutive gain map rows, which each include at least one intermediate gain value or zero gain value, may be grouped into a coded row run. Thus, as will be described in more detail below, a row run that includes a pixel position may be determined based at least in part on the run map 100.

In some embodiments, a starting row run indicator 108 may indicate whether a row run is a coded row run or an uncoded row run. For example, a starting row run indicator 108 of zero may indicate that the row run is a coded run and a starting row run indicator 108 of unity may indicate that the row run is an uncoded run or vice versa. In some embodiments, a starting row run indicator 108 may be associated with each row run to explicitly indicate categorization of a corresponding row run. To facilitate reducing size of the compressed gain map 90, in other embodiments, a starting row run indicator 108 may only be associated with a first (e.g., top) row run when the row runs may alternate between coded row runs and uncoded row runs. Accordingly, as will be described in more detail below, categorization of a row run and, thus, a gain map row that includes a pixel position may be determined based at least in part on the run map 100 and the starting row run indicator 108.

Additionally, in some embodiments, the position map 102 may indicate pixel positions included in gain runs of each coded row. As will be described in more detail below, one or more consecutive gain map entries, which each include at least one intermediate (e.g., between zero and unity) gain value, may be grouped into an intermediate gain run. Additionally, one or more consecutive gain map entries, which each only include zero gain values or only unity gain values, may be grouped into a position gain run. In other words, a position gain run may be a zero gain run or a unity gain run.

To facilitate determining pixel positions included in a gain run, in some embodiments, the position map 102 may indicate number of pixel positions included in the gain run. Additionally, in some embodiments, a coded row may alternate between position gain runs and intermediate gain runs. Furthermore, in some embodiments, the position map 102 may indicate pixel positions include in a first gain run relative to pixel positions included in a second gain run. Thus, as will be described in more detail below, a gain run that includes a pixel position may be determined based at least in part on the position map 100.

In some embodiments, a position gain value indicator 110 may indicate gain values associated with each pixel position in a corresponding position run. For example, a position gain value indicator 110 of zero may indicate that each (e.g., red, green, and/or blue) gain value associated with a pixel position in the corresponding position run is zero. Additionally, a position gain value indicator 110 of unity may indicate that each gain value associated with a pixel position in the corresponding position run is unity. In some embodiments, a position gain value indicator 110 may be associated with each position run. Thus, as will be described in more detail below, gain values associated with a pixel position in a position run may be determined based at least in part on a corresponding position gain value indicator 110.

Furthermore, in some embodiments, the gain value map 104 may indicate gain values associated with pixel positions in each intermediate gain run. In some embodiments, a gain value set associated with a pixel position may include one gain value per sub-pixel of a display pixel at the pixel position. For example, when a display pixel at a pixel position in an intermediate gain run includes three sub-pixels, the gain value map 104 may associate the pixel position with three gain values. Additionally, when a display pixel at a pixel position in an intermediate gain run includes a co-located sub-pixel and an offset sub-pixel, the gain value map 104 may associate the pixel position with a co-located gain value and an offset gain value.

Additionally or alternatively, a gain value set associated with a pixel position may include one gain value per color component of a display pixel at the pixel position. For example, when a display pixel at a pixel position in an intermediate gain run includes a red sub-pixel and a green sub-pixel, the gain value map 104 may associate the pixel position with a red gain value and a green sub-pixel. Additionally, when a display pixel at a pixel position in an intermediate gain run includes a blue sub-pixel and a green sub-pixel, the gain value map 104 may associate the pixel position with a blue gain value and a green sub-pixel. Thus, as will be described in more detail below, gain values associated with pixel positions in intermediate gain runs may be determined based at least in part on the gain value map 104.

One embodiment of a process 112 for operating the design device 94 is described in FIG. 10. Generally, the process 112 includes determining an uncompressed gain map (process block 114), determining a compressed gain map (process block 116), and storing the compressed gain map (process block 118). In some embodiments, the process 112 may be implemented by executing instructions stored in a tangible non-transitory computer-readable medium, such as the device memory 98, using processing circuitry, such as the device processor 96.

Accordingly, in some embodiments, the design device 94 may determine an uncompressed gain map (process block 114). As described above, an uncompressed gain map may explicitly associate (e.g., map) each pixel position to a gain value set. Additionally, in some embodiments, the uncompressed gain map may be determined based at least in part on sub-pixel layout of the electronic display 12, shape of an image corresponding with image pixel image data 70 received from the image data source 38, and/or display region shape of the electronic display 12.

To help illustrate, an example rectangular image frame 120 is shown in FIG. 11. As depicted, the rectangular image frame 120 includes four straight borders 125 connected by four ninety degree corners 124. For example, the rectangular image frame 120 a top straight border 125A and a left straight border 125B connected at a top left ninety degree corner 124A. To display the rectangular image frame 120, the display pipeline 36 may receive image pixel image data 70 corresponding with each image pixel in the rectangular image frame 120.

Figure 12:
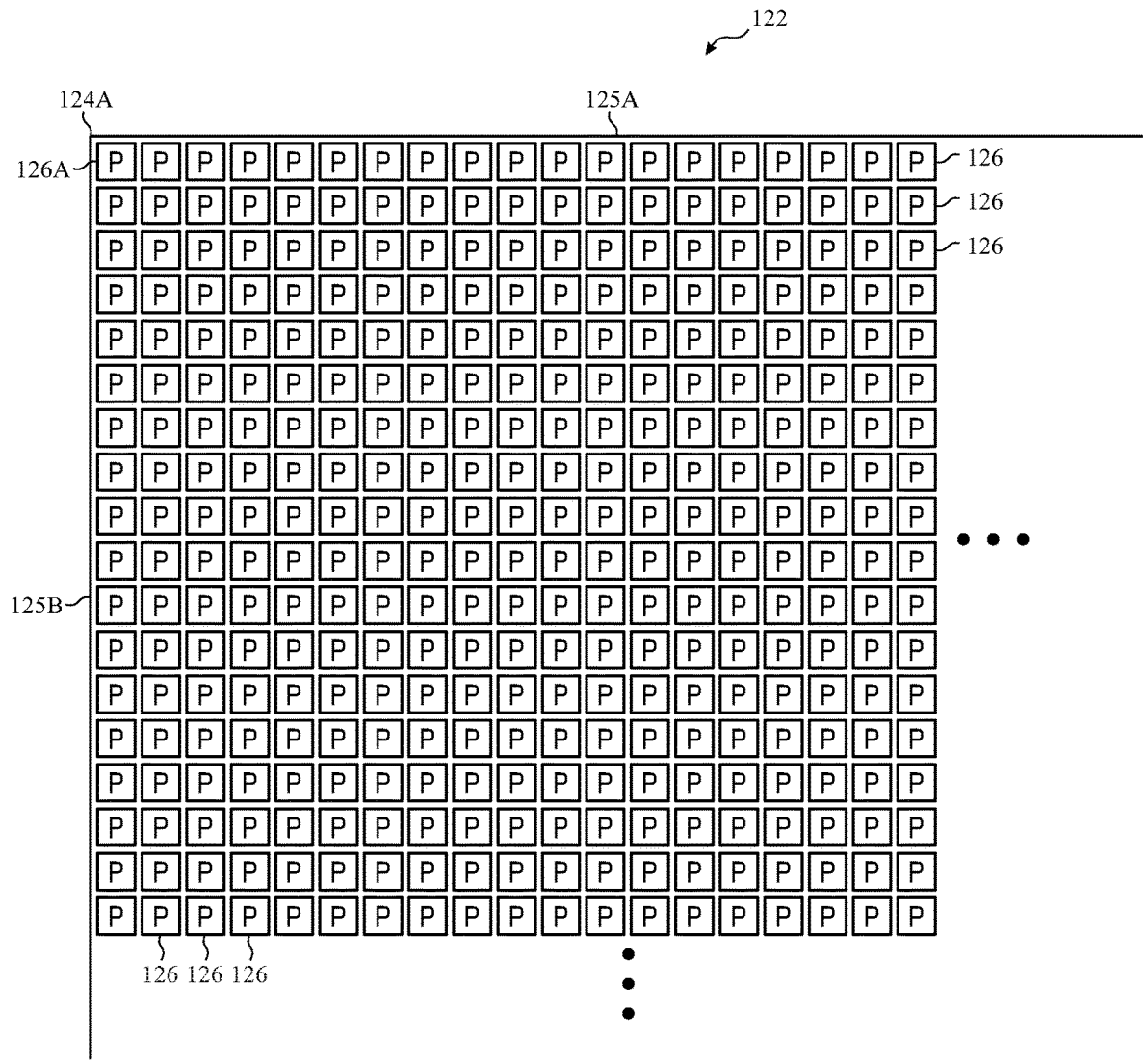
FIG. 12 a diagrammatic representation of image pixels in a top-left portion of the rectangular image frame of FIG. 11, in accordance with an embodiment.

To help illustrate, image pixels 126 in a top left portion 122 of the rectangular image frame 120 are shown in FIG. 12. In the depicted embodiment, each image pixel 126 corresponds to a pixel position. As described above, image pixel image data 70 corresponding with an image pixel 126 may indicate target luminance at a pixel position in an image. For example, image pixel image data 70 corresponding with a first image pixel 126A may indicate target luminance of a red component, target luminance of a blue component, and target luminance of a green component at a first pixel position.

Figure 13:
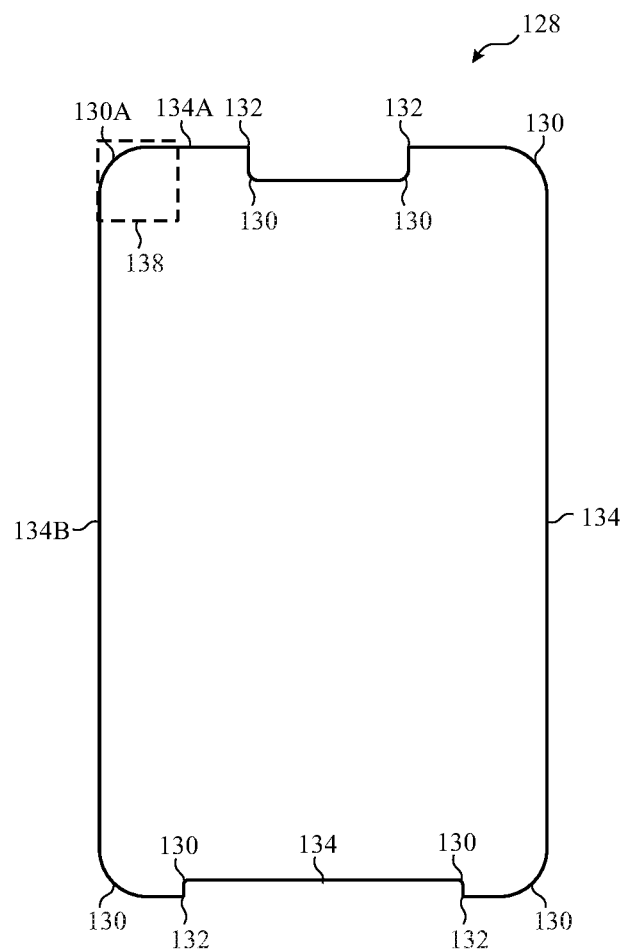
FIG. 13 is an example of a display region with a non-rectangular shape, in accordance with an embodiment.
Figure 14:
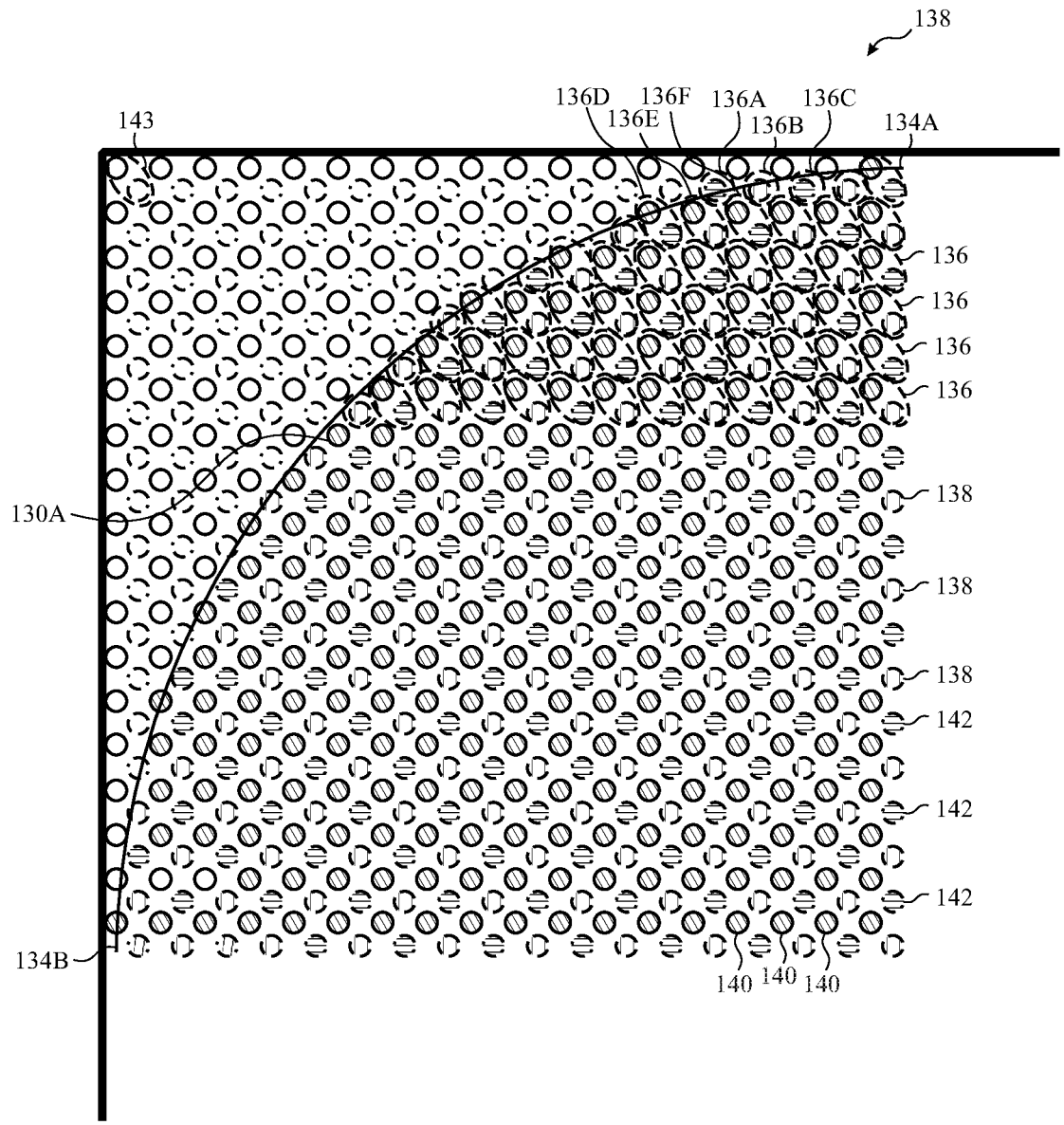
FIG. 14 is an example of display pixels in a top-left portion of the display region of FIG. 13 including a rounded border, in accordance with an embodiment.

However, as described above, different electronic displays 12 may have differing display region shapes. To help illustrate, an example of a non-rectangular display region 128 is shown in FIG. 13. It should be appreciated that the depicted display region is merely intended to be illustrative and not limiting. In other words, non-rectangular display regions implemented in other electronic displays 12 may vary in shape. For example, an electronic display 12 may be implemented with a circular (e.g., non-rectangular) display region.

As depicted, the non-rectangular display region 128 includes multiple straight borders 134 connect by rounded (e.g., curved) borders 130. For example, the non-rectangular display region 128 includes a top straight border 134A and a left straight border 134B connected via a top-left rounded border 130A. In some embodiments, the non-rectangular display region 128 may nevertheless include one or more ninety-degree corners 132.

As described above, the electronic display 12 may display an image based on corresponding image data. For example, the electronic display 12 may display an image by controlling luminance of its display pixels based on display pixel image data 72 generated by processing image pixel image data 70. Thus, the non-rectangular display region 128 may be defined by pixel positions corresponding to display pixels implemented in the electronic display 12.

To help illustrate, display pixels 136 in a top-left portion 138 of the non-rectangular display region 128 are shown in FIG. 13. It should be appreciated that the depicted display pixels 136 are merely intended to be illustrative and not limiting. In other words, display pixels 136 in other electronic displays 12 may be implemented with varying sub-pixel layouts.

In the depicted embodiment, the display pixels 136 are organized in rows and columns. For example, a first display pixel row includes a first display pixel 136A, a second display pixel 136B, a third display pixel 136C, and so on. Additionally, a second display pixel row includes a fourth display pixel 136D, a fifth display pixel 136E, a sixth display pixel 136F, and so on.

As described above, a display pixel 136 may include one or more sub-pixels, which each control luminance of a corresponding color component. In the depicted embodiment, the display pixels 136 includes red sub-pixels 138, green sub-pixels 140, and blue sub-pixels 142. Additionally, in the depicted embodiment, display pixels 136 fully contained in the non-rectangular display region 128 each include two sub-pixels—namely a green sub-pixel 140 and alternatingly a red sub-pixel 138 or a blue sub-pixel 142. For example, along the second display pixel row, the fourth display pixel 136D includes a blue sub-pixel 142 and a green sub-pixel 140, the fifth display pixel 136E includes a red sub-pixel 138 and a green sub-pixel 140, the sixth display pixel 136F includes a red sub-pixel 138 and a green sub-pixel 140, and so on.

To implement the non-rectangular display region 128, some display pixels 136 along a rounded border 130 may include fewer sub-pixels. In the depicted embodiment, such display pixels 136 may each include one sub-pixel—namely alternatingly a red sub-pixel 138 or a blue sub-pixel 142. For example, due to the top-left rounded border 130A, the first display pixel 136A includes only a blue sub-pixel 142, the second display pixel 136B includes only a red sub-pixel 138, and the third display pixel 136C includes only a blue sub-pixel 142.

In any case, as described above, each display pixel 136 may correspond with a pixel position and, thus, an image pixel received from the image data source 38. With regard to the depicted embodiment, each display pixel 136 may correspond with an image pixel 126 co-located with its green sub-pixel 140 or where a corresponding green sub-pixel 140 would otherwise be located. In other words, the green sub-pixels 140 may be co-located sub-pixels, whereas the red sub-pixels 138 and the blue sub-pixels 142 are offset sub-pixels. Additionally, in the depicted embodiment, the offset sub-pixel (e.g., red sub-pixel 138 or blue sub-pixel 142) is offset to the bottom-right of the co-located sub-pixel (e.g., green sub-pixel 140). In other embodiments, the offset sub-pixel may be offset to the top-right, top-left, or bottom-left of the co-located sub-pixel.

To display an image frame, luminance of each display pixel 136 may be controlled based at least in part on an image pixel image data 70 corresponding with an image pixel 126 at its pixel position. However, in some instances, shape of the image frame may differ from display region shape of the electronic display 12. In such instances, one or more image pixels 126 may correspond to pixel positions outside the display region. For example, the first image pixel 126A in the rectangular image frame 120 may correspond to a pixel position 143, which is outside the non-rectangular display region 128. In other words, a display pixel 136 may not be implemented in the electronic display 12 at a pixel position corresponding with an image pixel 126.

Thus, to facilitate displaying an image frame on a display region with a different shape, the image frame may be adjusted before display, for example, by applying a black mask. However, as described above, display pixels 136 may rely on color blending to enable perception of a range of different colors. In other words, simply disregarding image pixels corresponding to a pixel positions outside the display region may, in some instances, result in perceivable aliasing at a display pixel 136 along a rounded border 130 since neighboring display pixels 136 that the display pixel 136 would otherwise be blended with are not present. Moreover, perceivable color fringing may occur at a display pixel 136 along a straight border 134 since neighboring display pixels 136 that the display pixel 136 would otherwise be blended with are not present.

To facilitate improving perceived image quality, as described above, image pixel image data 70 may be processed based on gain values associated with a corresponding pixel position. Additionally, as described above, a design device 94 may determine an uncompressed gain map that explicitly associates (e.g., maps) each pixel position to a gain value set. Accordingly, to determine the uncompressed gain map, the design device 94 may determine one or more gain values associated with each pixel position and, thus, each sub-pixel position at the pixel positions.

Figure 15:
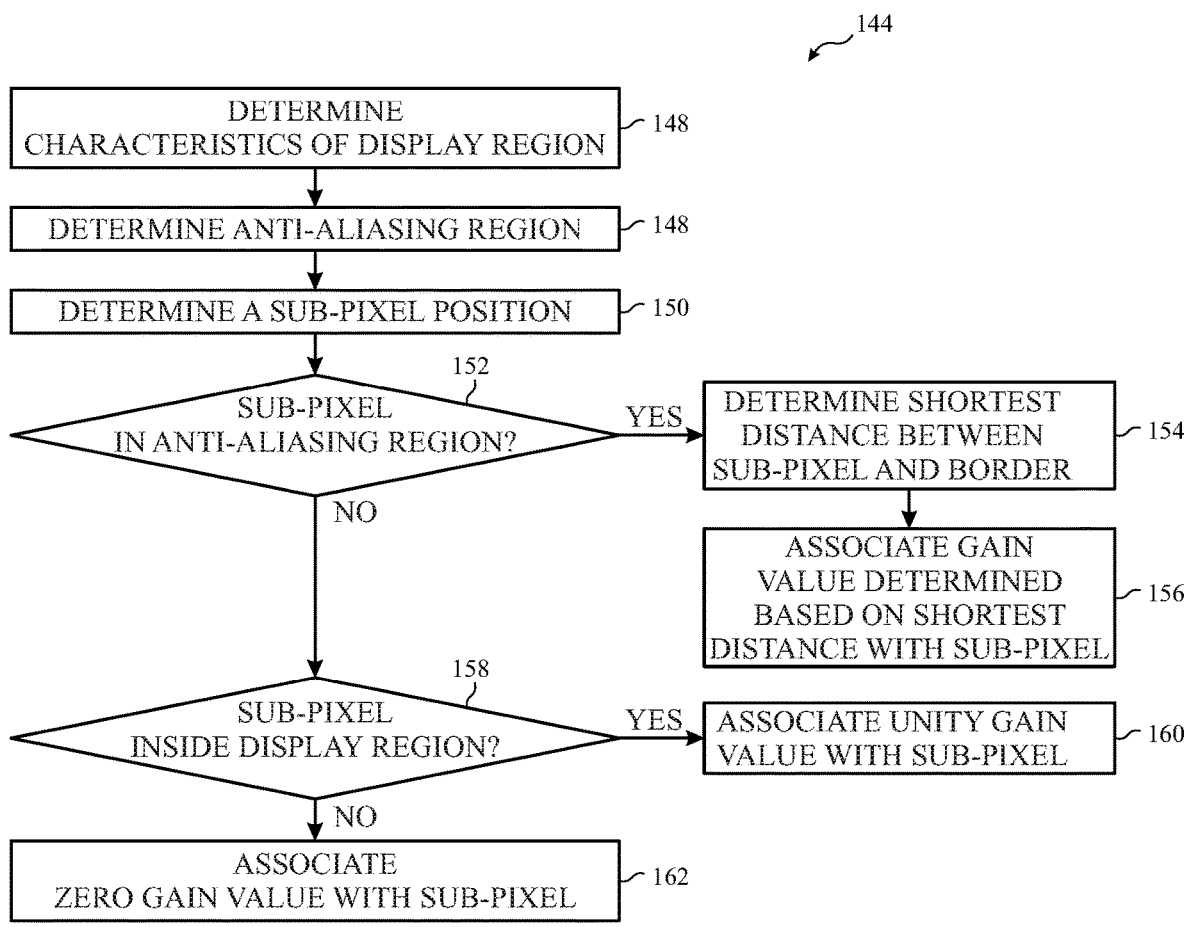
FIG. 15 is a flow diagram of a process for determining gain values to be applied at sub-pixels along a rounded border, in accordance with an embodiment.

To help illustrate, one embodiment of a process 144 for associating a gain value to a sub-pixel position is described in FIG. 15. Generally, the process 144 includes determining characteristics of a display region (process block 146), determining an anti-aliasing region (process block 148), determining a sub-pixel position (process block 150), and determining whether the sub-pixel position is in the anti-aliasing region (decision block 152). When the sub-pixel position is in the anti-aliasing region, the process 144 includes determining shortest distance between the sub-pixel position and a border of the display region (process block 154) and associating a gain value determined based on the shortest distance with the sub-pixel position (process block 156). When the sub-pixel position is not in the anti-aliasing region, the process 144 includes determining whether the sub-pixel position is within the display region (decision block 158), associating a unity gain value with the sub-pixel positon when the sub-pixel is inside the display region (process block 160), and associating a zero gain value with the sub-pixel positon when the sub-pixel is not inside the display region (process block 162). In some embodiments, the process 144 may be implemented by executing instructions stored in a tangible non-transitory computer-readable medium, such as the device memory 98, using processing circuitry, such as the device processor 96.

Accordingly, in some embodiments, the design device 94 may determine expected characteristics of a display region implemented in an electronic display 12 (process block 146). In some embodiments, characteristics of a display region may include sub-pixel layout, shape of the display region, location of its border, sub-pixel positions in the display region, and/or the like. Generally, characteristics of an electronic display 12 may be fixed. Thus, in some embodiments, expected characteristics of the display region may be determined and input to the design device 94, for example, by a manufacturer via one or more input devices. Additionally or alternatively, the design device 94 may determine expected characteristics of the display region by analyzing the electronic display 12.

To reduce likelihood of producing perceivable aliasing, the design device 94 may determine one or more anti-aliasing region along a border of the display region (process block 148). As described above, perceivable aliasing may occur along a rounded border of a display region. Thus, in some embodiments, the design device 94 may determine an anti-aliasing region along a rounded border of the display region, which includes sub-pixel positions at one or more pixel positions adjacent the rounded border.

Figure 16:
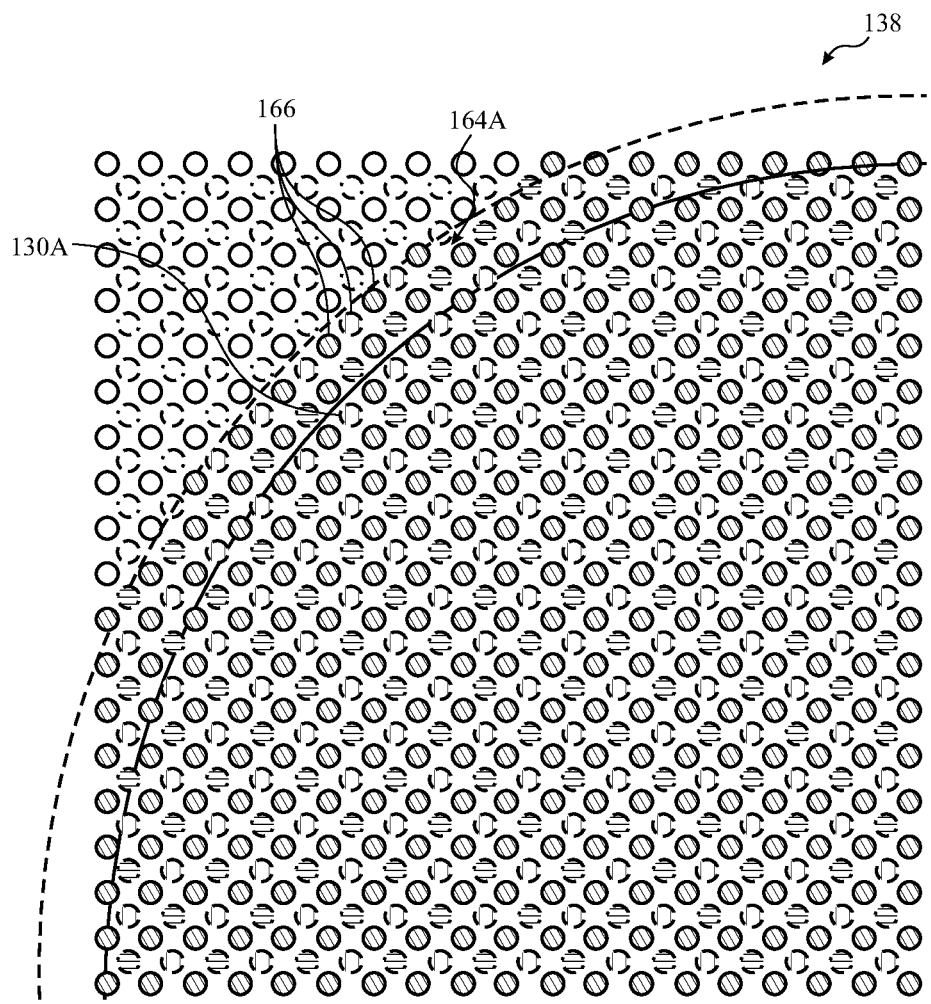
FIG. 16 is an example anti-aliasing region used to determine gain values to be applied along the rounded border of FIG. 14, in accordance with an embodiment.
Figure 17:
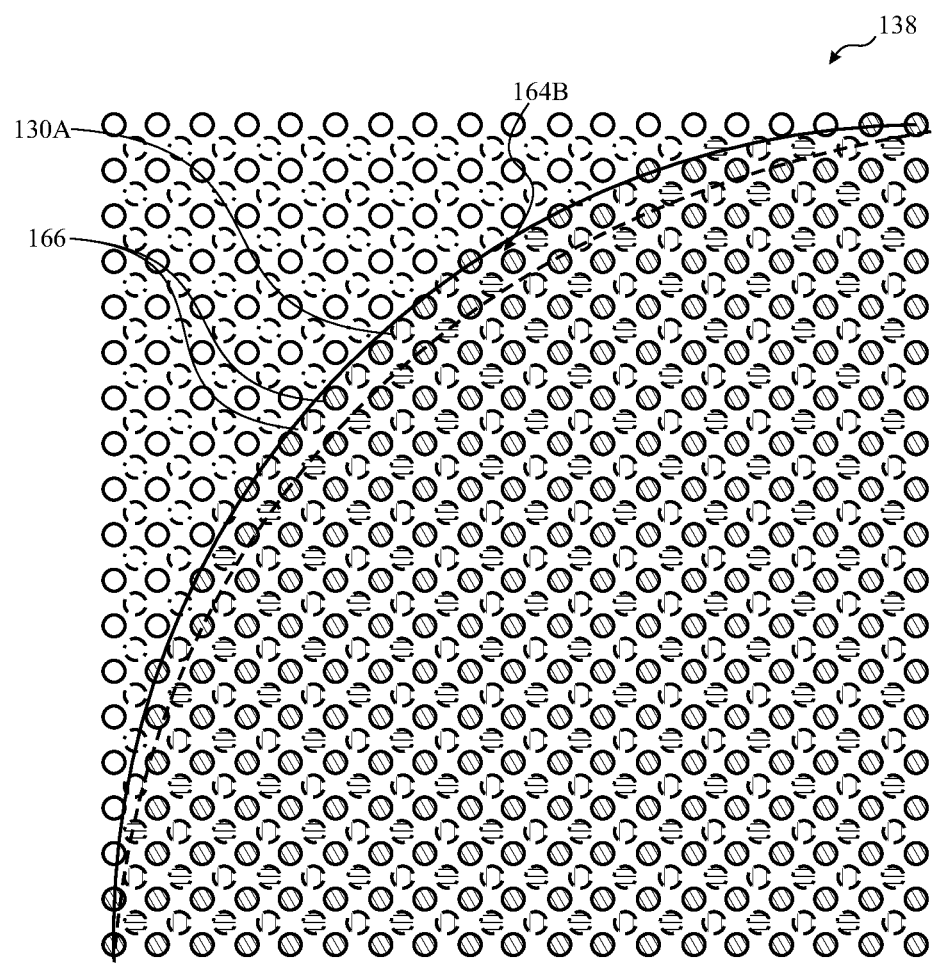
FIG. 17 is another example anti-aliasing region used to determine gain values to be applied along the rounded border of FIG. 14, in accordance with an embodiment.

To help illustrate, two examples of anti-aliasing regions 164 along the top-left rounded corner 130A of the non-rectangular display region 128 are shown in FIGS. 16 and 17. In particular, a first anti-aliasing region 164A, which includes sub-pixels positions 166 outside the non-rectangular display region 128, is shown in FIG. 16. On the other hand, a second anti-aliasing region 164B, which includes sub-pixels positions 166 inside the non-rectangular display region 128, is shown in FIG. 17. It should be appreciated that the example anti-aliasing regions 164 are merely intended to be illustrative and not limiting. In other words, other embodiments may implement anti-aliasing regions 164 with varying shape and/or varying number of sub-pixel positions.

With regard to FIG. 16, the first anti-aliasing region 164A includes sub-pixels 166 each within a fixed threshold distance from the top-left rounded corner 130A. In some embodiments, the fixed threshold distance may be the expected distance between adjacent pixel positions, expected distance between adjacent image pixels 126, or expected distance between co-located sub-pixels in adjacent display pixels 136. Thus, in some embodiments, an anti-aliasing region 164 may be determined to include sub-pixel positions 166 within a uniform distance from a rounded display region border.

Additionally, with regard to FIG. 17, the second anti-aliasing region 164B includes sub-pixel positions 166 each within a variable distance threshold distance from the top left rounded corner 130A. In some embodiments, the distance threshold may vary based at least in part on curvature of a rounded display region border. For example, due to shape of the top left rounded corner 130A and sub-pixel layout, the variable distance threshold may be larger at a central portion of the top left rounded corner 130A. Thus, in some embodiments, an anti-aliasing region 164 may be determined to include sub-pixel positions 166 within a variable distance from a rounded display region border.

In some embodiments, an anti-aliasing region 164 may be indicated by included sub-pixel positions 166. Thus, to facilitate subsequently identifying the anti-aliasing region 164, the design device may predetermine characteristics of the anti-aliasing region 164 and store its included sub-pixel positions in a memory component, such as device memory 98. In a similar manner, the design device 94 may determine an anti-aliasing region 164 along each rounded display region border.

Returning to the process 144 of FIG. 15, the design device 94 may determine a sub-pixel position (process block 150). As described above, a display pixel 136 may include one or more sub-pixels. Thus, a pixel position corresponding with the display pixel 136 may include a sub-pixel position corresponding with each of the one or more sub-pixels. In some embodiments, the sub-pixel position may be determined and input to the design device 94, for example, by a manufacturer via one or more input devices. Additionally or alternatively, the design device 94 may determine the sub-pixel position by analyzing the electronic display 12 and/or expected image pixel image data 70.

The design device 94 may determine whether the sub-pixel position is expected to be within an anti-aliasing region 164 (decision block 152). As described above, in some embodiments, an anti-aliasing region 164 may be indicated by included sub-pixel position, which may be stored in a memory component, such as device memory 98. Thus, in such embodiments, the design device 94 may poll the memory component to determine sub-pixel positions included in the anti-aliasing region 164 and determine whether the sub-pixel position is expected to be within the anti-aliasing region 164 by comparing the sub-pixel position with the sub-pixel positions included in the anti-aliasing region 164. Additionally or alternatively, the design device 94 may determine whether the sub-pixel position is expected to be within the anti-aliasing region 164 based at least in part on a distance threshold associated with the anti-aliasing region 164.

When not within the anti-aliasing region 164, the design device 94 may determine whether the sub-pixel position is expected to be inside the display region (decision block 158). As described above, in some embodiments, a display region may be indicated by included sub-pixel positions, which may be stored in a memory component, such as device memory 98. Thus, in such embodiments, the design device 94 may poll the memory component to determine sub-pixel position included in the display region and determine whether the sub-pixel position is expected to be within the display region by comparing the sub-pixel position with the sub-pixel positions included in the display region.

When the sub-pixel position is not expected to be inside the display region, the design device 94 may determine that a sub-pixel is not expected to be implemented in the electronic display 12 at the sub-pixel position and, thus, associate the sub-pixel position with a zero gain value (process block 162). On the other hand, when the sub-pixel position is expected to be inside the display region, the design device 94 may determine that a sub-pixel is expected to be implemented in the electronic display 12 at the sub-pixel position and, thus, associate the sub-pixel position with a unity gain value (process block 160). In this manner, the design device 94 may determine gain values, which when applied results in a black mask being applied to image data corresponding to sub-pixel positions outside the display region.

When the sub-pixel position is expected to be in the anti-aliasing region 164, the design device 94 may determine expected distance between the sub-pixel position and a border of the display region (process block 154). As described above, in some embodiments, expected characteristics of the display region may be predetermined and stored in a memory component, such as device memory 98. Thus, in such embodiments, the design device 94 may poll the memory component to determine expected location of the display region border and determine expected distance between the sub-pixel position and the display region border based at least in part on relative distance between the sub-pixel position and the expected location of the display region border.

Based at least in part on shortest distance from the display region border, the design device 94 may associate a gain value with the sub-pixel position (process block 156). In some embodiments, the gain value may be inversely proportional to the shortest distance between the sub-pixel and the display region border. In other words, gain value may decrease as expected distance between the sub-pixel and the display region border increases. Applying gain values determined in this manner may relatively linearly dim sub-pixels, which may reduce likelihood of producing perceivable aliasing along a rounded portion of the display region border.

In a similar manner, the design device 94 may associate a gain value with each sub-pixel position and, thus, each pixel position. As described above, an uncompressed gain may explicitly associate (e.g., map) a gain value set to each pixel position. Accordingly, the design device 94 may determine an uncompressed gain map based on the gain value associated with each sub-pixel position.

Figure 18:
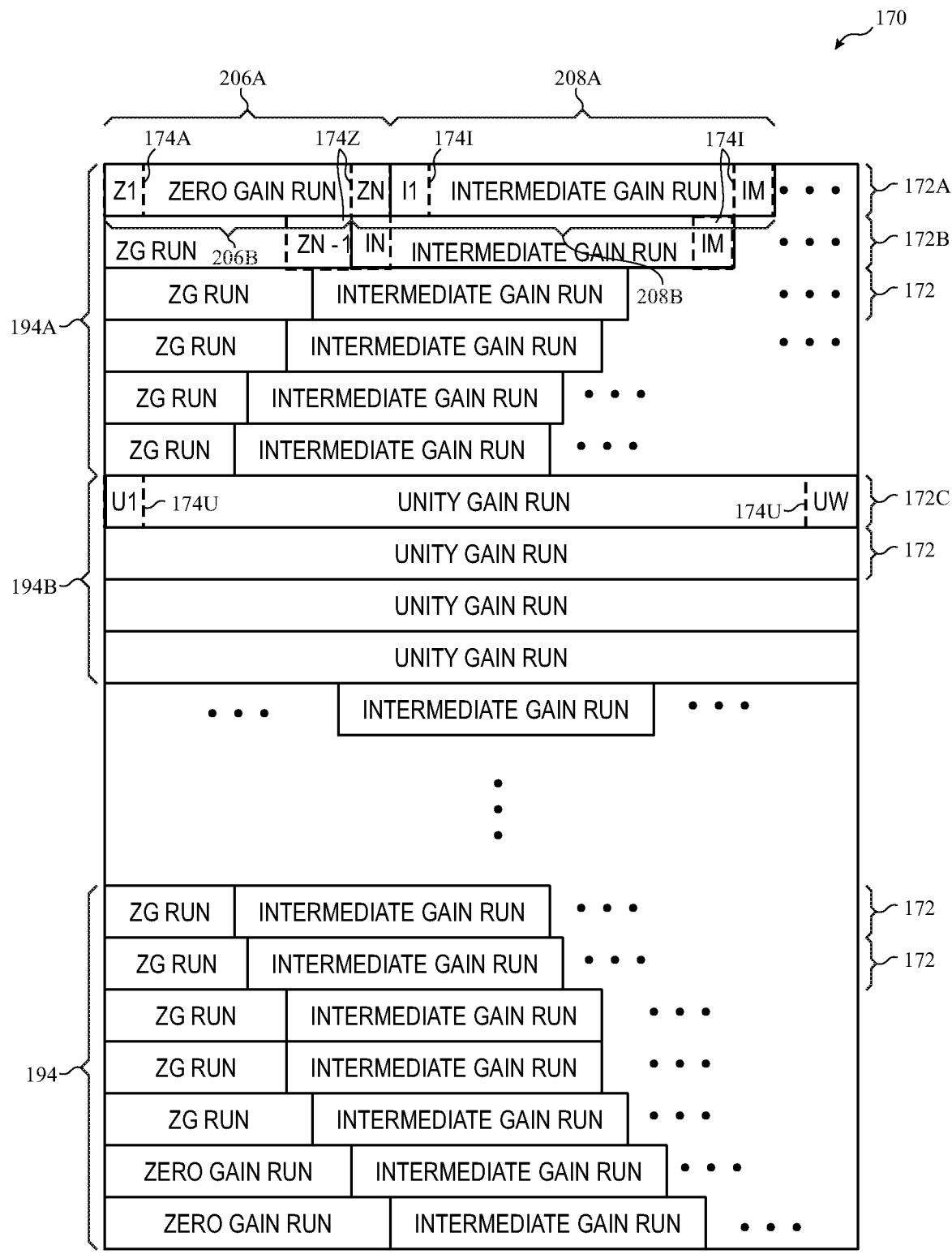
FIG. 18 is a diagrammatic representation of an uncompressed gain map, in accordance with an embodiment.

To help illustrate, an example of an uncompressed gain map 170 is shown in FIG. 18. It should be appreciated that the described uncompressed gain map 170 is merely intended to be illustrative and not limiting. In other words, other embodiments may implement an uncompressed gain map 170 in other forms.

In any case, in the depicted embodiment, the uncompressed gain map 170 includes gain map entries 174 organized in multiple gain map rows 172. Each gain map entry 174 may correspond with a pixel position and, thus, explicitly map the pixel position to a gain value set. For example, a first gain map entry 174A may associate the pixel position 143 of the first image pixel 126A with a gain value set. As described above, a pixel position may include one or more sub-pixel positions and a gain value set may include a gain value corresponding with each sub-pixel position at the pixel position. In other words, a gain map entry 174 may explicitly map a gain value to each sub-pixel position at a corresponding pixel position.

As described above, size of an uncompressed gain map 170 may be dependent on resolution of the electronic display 12 and, thus, be relatively large. Accordingly, in some embodiments, the design device 94 may store the uncompressed gain 170 in external memory 44, thereby providing the display pipeline 36 access to the uncompressed gain 170 via a direct memory access channel 58. However, as described above, providing the display pipeline 36 access to the uncompressed gain 170 via a direct memory access channel 58 may affect implementation associated cost (e.g., to increase bandwidth of the direct memory access channel 58) and/or processing efficiency of the display pipeline 36.

Thus, returning to the process 112 of FIG. 10, the design device 94 may determine a compressed gain map 90 (process block 116). In some embodiments, a compressed gain map 90 may indirectly associate each pixel position to a gain value set. For example, the display pipeline 36 may determine a gain value set associated with a pixel position by decompressing the compressed gain map 90 to determine a corresponding uncompressed gain map 170. Thus, in some embodiments, the design device 94 may determine the compressed gain map 90 based at least in part on the corresponding uncompressed gain map 170.

Figure 19:
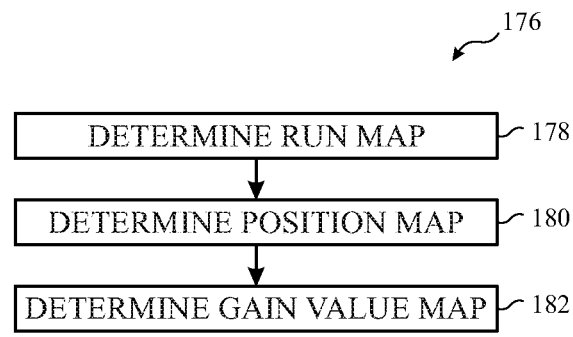
FIG. 19 is a flow diagram of a process for determining a compressed gain map, in accordance with an embodiment.

To help illustrate, one embodiment of a process 176 for determining a compressed gain map 90 is described in FIG. 19. Generally, the process 176 includes determining a run map (process block 178), determining a position map (process block 180), and determining a gain value map (process block 182). In some embodiments, the process 176 may be implemented by executing instructions stored in a tangible non-transitory computer-readable medium, such as the device memory 98, using processing circuitry, such as the device processor 96.

Accordingly, in some embodiments, the design device 94 may determine the run map 100 based on the uncompressed gain map 170 (process block 178). As described above, the run map 100 indicates number of gain map rows 172 included in each row run. Additionally, as described above, one or more consecutive gain map rows 172 with the same categorization (e.g., coded row or uncoded row) may be grouped into a row run (e.g., coded row run or uncoded row run).

Figure 20:
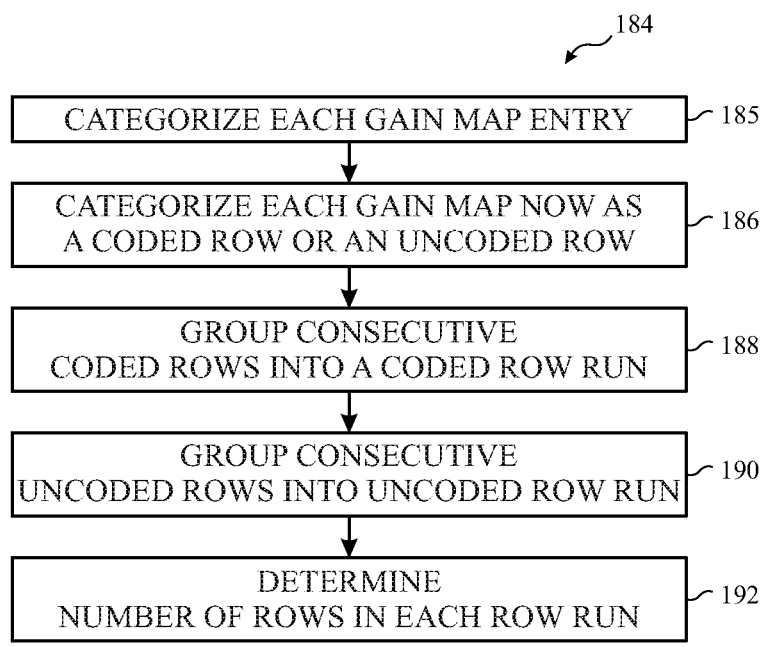
FIG. 20 is a flow diagram of a process for determining a run map included in the compressed gain map, in accordance with an embodiment.

One embodiment of a process 184 for determining a run map 100 is described in FIG. 20. Generally, the process 184 includes categorizing each gain map entry (process block 185), categorizing each gain map row as a coded row or an uncoded row (process block 186), grouping consecutive coded rows into a coded row run (process block 188), grouping consecutive uncoded rows into an uncoded run (process block 190), and determining number of gain map rows in each row run (process block 192). In some embodiments, the process 184 may be implemented by executing instructions stored in a tangible non-transitory computer-readable medium, such as the device memory 98, using processing circuitry, such as the device processor 96.

Accordingly, in some embodiments, the design device 94 may analyze the uncompressed gain map 170 to categorize each gain map entry 174 as a zero gain map entry, an intermediate gain map entry, or a unity gain map entry (process block 185). In some embodiments, a gain map entry 174 may be categorized as a unity gain map entry when each of its gain values is unity. Additionally, a gain map entry 174 may be categorized as a zero gain map entry when each of its gain values is zero. Furthermore, a gain map entry 174 may be categorized as an intermediate gain map entry when at least one of its gain values is an intermediate gain value (e.g., greater than zero and less than unity).

For example, with regard to the uncompressed gain map 170 of FIG. 18, the design device 94 may categorize each of the first N gain map entries 174 in a first gain map row 172A as a zero gain map entry 174Z and each of the next M gain map entries in the first gain map row 172A as an intermediate gain map entry 174I. Additionally, the design device 94 may categorized each of the first N−1 gain map entries 174 in a second gain map row 172B as a zero gain map entry 174Z and each of the next M gain map entries in the second gain map row 172B as an intermediate gain map entry 174I. Furthermore, the design device 94 may categorize each gain map entry 174 in a seventh gain map row 172C as a unity gain map entry 174U. In this manner, the design device 94 may categorize each gain map entry 174 in an uncompressed gain map 170 as a zero gain map entry 174Z, an intermediate gain map entry 174I, or a unity gain map entry 174U.

Returning to the process 184 of FIG. 20, based at least in part on categorization of the gain map entries 174, the design device 94 may categorize each gain map rows 172 as either a coded row or an uncoded row (process block 186). As described above, a gain map row 172 may be categorized as a coded row when at least one of its gain map entries 174 includes an intermediate gain value or a zero gain value. In other words, the design device 94 may categorize a gain map row 172 as a coded row when the gain map row 172 includes at least one zero gain map entry 174Z or intermediate gain map entry 174. For example, with regard to the uncompressed gain map 170 of FIG. 18, the design device 94 may categorize each of the first six gain map rows 172 a coded row since each includes multiple zero gain map entries 174Z and intermediate gain map entries 174.

Additionally, as described above, a gain map row 172 may be categorized as an uncoded row when the gain map row 172 only includes unity gain values. In other words, the design device 94 may categorize a gain map row 172 as an uncoded row when the gain map row 172 includes only unity gain map entries 174U. For example, with regard to the uncompressed gain map 170 of FIG. 18, the design device 94 may categorize each of the next four gain map rows 172 an uncoded row since each includes only unity gain map entries 174U. In this manner, the design device 94 may categorize each gain map row 172 in an uncompressed gain map 170 as either a coded row or an uncoded row.

Returning to the process 184 of FIG. 20, the design device 94 may group each gain map row 172 into a row run based at least in part on its row categorization. In particular, the design device 94 may group one or more consecutive gain map row 172, each categorized as a coded row, into a coded row run (process block 188). Additionally, the design device 94 may group one or more consecutive gain map row 172, each categorized as an uncoded row, into an uncoded row run (process block 190). For example, with regard to the uncompressed gain map 170 of FIG. 18, the design device 94 may group the first six gain map rows 172 into a first row run 194A (e.g., coded row run) since each is categorized as a coded row. Additionally, the design device 94 may group the next four gain map rows 172 into a second row run 194B (e.g., uncoded row run) since each is categorized as an uncoded row. In this manner, the design device 94 may group each gain map row 172 of an uncompressed gain map 170 in a row run.

Returning to the process 184 of FIG. 20, the design device 94 may determine number of gain map rows 172 in each row run (process block 192). For example, with regard to the uncompressed gain map 170 of FIG. 18, the design device 94 may determine that the first row run 194A includes six gain map rows 172 and, thus, indicate a value of six in a first run map entry. Additionally, the design device 94 may determine that second row run 194B includes four gain map rows 172 and, thus, indicate a value of four in a second run map entry. In this manner, the design device 94 may determine the run map 100 such that each run map entries indicates number of gain map row 172 of an uncompressed gain map 170 included in a corresponding row run.

To facilitate subsequent decompression, in some embodiments, the run map 100 may explicitly indicate whether each row run 194 is a coded row run or an uncoded row run. In other embodiments, to facilitate further reducing size of the compressed gain map 90, the design device 94 may determine a starting row run indicator 108 and alternate between categorizing consecutive row runs 194 as coded row runs and uncoded row runs. In such embodiments, categorization of the first row run 194A may be determined based on the starting row run indicator 108 and categorization of each subsequent row run 194 may be determined based on categorization of a directly previous (e.g., top neighbor) row run 194, thereby obviating bits that may otherwise be used to explicitly specify whether each of the subsequent row runs 194 is a coded row run or an uncoded row run. In this manner, the design device 94 may determine the run map 100 and one or more starting row run indicators 108 to facilitate determining categorization of each row run 194 and, thus, categorization of each gain map row 172 and/or gain values associated with pixel positions in uncoded rows, for example, by the display pipeline 36.

Returning to the process 176 of FIG. 19, the design device 94 may determine the position map 102 based at least in part on the uncompressed gain map 170 (process block 180). As described above, the position map 102 may indicate number of gain map entries 174 included in each gain run of a coded row. Additionally, as described above, one or more consecutive gain map entries with the same categorization may be grouped into a gain run.

Figure 21:
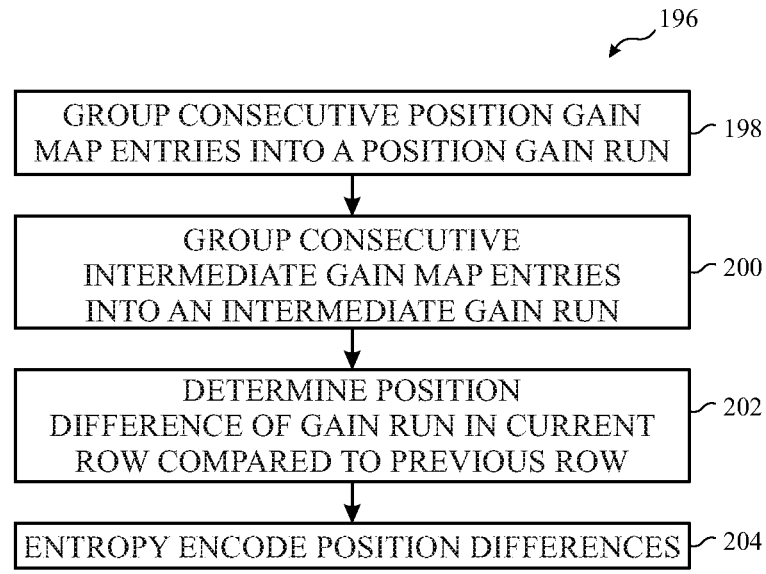
FIG. 21 is a flow diagram of a process for determining a position map included in the compressed gain map, in accordance with an embodiment.

One embodiment of a process 196 for determining a position map 102 is described in FIG. 21. Generally, the process 196 includes grouping consecutive position gain map entries into a position gain run (process block 198), grouping consecutive intermediate gain map entries into an intermediate gain run (process block 200), determining position difference between a gain run in a current row compared to a previous row (process block 202), and entropy encoding the position differences (process block 204). In some embodiments, the process 196 may be implemented by executing instructions stored in a tangible non-transitory computer-readable medium, such as the device memory 98, using processing circuitry, such as the device processor 96.

Accordingly, in some embodiments, the design device 94 may group consecutive gain map entries 174 in a coded row into gain runs based at least in part on respective entry categorization. In particular, the design device 94 may group one or more consecutive zero gain map entries 174Z or one or more consecutive unity gain map entries 174U into a position gain run (process block 198). In other words, a position gain run may be a zero gain run, which includes only zero gain map entries 174Z, or a unity gain run, which includes only unity gain map entries 174U. Additionally, the design device 94 may group one or more consecutive intermediate gain map entries 174I into an intermediate gain run (process block 200).

For example, with regard to the uncompressed gain map 170 of FIG. 18, the design device 94 may group the first N gain map entries 174 in the first gain map row 172A into a first position gain run 206A since each is a categorized as a zero gain map entry 174Z. Additionally, the design device 94 may group the next M gain map entries 174 in the first gain map row 172A into a first intermediate gain run 208A since each is a categorized as an intermediate gain map entry 174I. Furthermore, the design device 94 may group the first N−1 gain map entries 174 in a second gain map row 172 into a second position gain run 206B and the next M gain entries into a second intermediate gain run 208B.

Based at least in part on number of gain map entries 174 in each preceding gain run, gain map entries 174 and, thus, pixel positions included in each gain run may be determined. For example, indicating that the first position gain run 206A includes the N gain map entries 174 enables determining that the first N gain map entries 174 of the first gain map row 172A are included in the first and that the first intermediate gain run 208A starts at the N+1th gain map entry 174 of the first gain map row 172A. Additionally, indicating that the first intermediate gain run 208A includes M gain map entries 174 enables determining that the next M gain map entries 174 of the first gain map row 172A are included in the first intermediate gain run 208A and that the first intermediate gain run 208A ends on the N+Mth gain map entry 174 of the first gain map row 172A. Thus, to facilitate subsequent decompression, in some embodiments, the position map 102 may explicitly indicate number of gain map entries 174 included in each gain run.

Returning to the process 196 of FIG. 21, in other embodiments, the design device 94 may determine position difference of a gain run in a current row compared to a directly previous (e.g., top neighbor) row (process block 202) and entropy encode the position difference (process block 204) to facilitate further reducing size of the compressed gain map 90. In some embodiments, the position difference may indicate number of pixel positions separating a starting gain map entry 174 of a gain run in the current row and a starting gain map entry 174 of a corresponding gain run in the directly previous row.

For example, with regard to the uncompressed gain map 170 of FIG. 18, the design device 94 may determine that the first intermediate gain run 208A starts at the N+1th gain map entry 174 of the first gain map row 172A. Additionally, the design device 94 may determine that the second intermediate gain run 208B starts at the Nth gain map entry 174 of the second gain map row 172B. Thus, instead of explicitly indicating that the second position gain run of the second gain map row 172B includes N−1 gain map entries 174, the starting gain map entry 174 of the second intermediate gain run 208 may be indicated as one pixel position before the starting gain map entry 174 of the first intermediate gain run 208 in the first gain map row 172A. Additionally, in some embodiments, the position difference may be entropy encoded using an exponential-Golomb encoding algorithm. In this manner, the design device 94 may determine the position map 102 to facilitate determining pixel positions in each gain run of a coded row.

In any case, to facilitate subsequent decompression, the compressed gain map 90 may indicates whether the position gain run is a zero gain run or a unity gain run. As described above, a position gain value indicator 110 may indicate a gain value of each gain map entry 174 in a corresponding position gain run. Thus, the design device 94 may determine and associate a position gain value indicator 110 with each position gain run.

For example, with regard to the uncompressed gain map 170 of FIG. 18, the design device 94 may associate a first position gain value indicator 110 with the first position gain run 206A, which indicates that each gain map entry 174 in the first position gain run is a zero gain map entry 174Z. Additionally, the design device 94 may associate a second position gain value indicator 110 with the second position gain run 206B, which indicates that each gain map entry 174 in the second position gain run is a zero gain map entry 174Z. Additionally or alternatively, the design device 94 may associate a position gain value indicator 110 with a position gain run, which indicates that each gain map entry 174 in the position gain run is a unity gain map entry 174U. In this manner, the design device 94 may determine the position map 102 and one or more position gain value indicators 110 to facilitate determining gain values associated with each pixel position in a position gain run, for example, by the display pipeline 36.

Returning to the process 176 of FIG. 17, the design device 94 may determine the gain value map 104 based at least in part on the uncompressed gain map 170 (process block 182). As described above, the gain value map 104 may indicate gain values of gain map entries 174 and, thus, gain values associated with corresponding pixel position in each intermediate gain run. Additionally, in some embodiments, the gain value map 104 may indicate gain values of a gain map entry 174 based at least in part on gain values of a directly previous (e.g., left neighbor) gain map entry 174.

Figure 22:
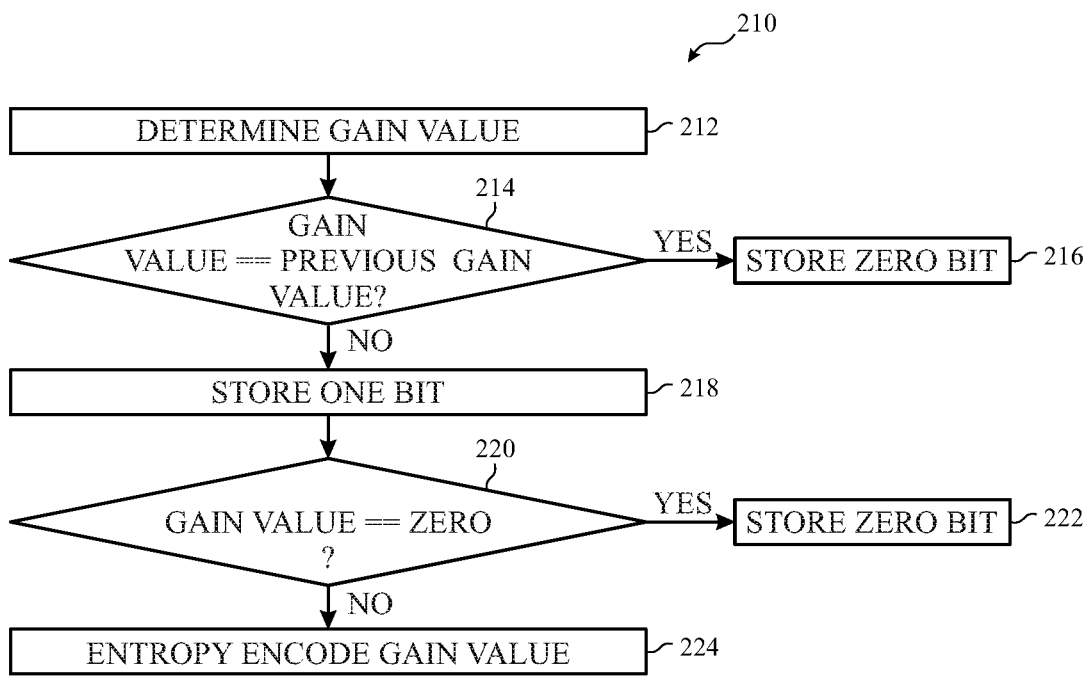
FIG. 22 is a flow diagram of a process for determining a gain value map included in the compressed gain map, in accordance with an embodiment.

One embodiment of a process 210 for determining a gain value map 104 is described in FIG. 22. Generally, the process 210 includes determining a gain value (process block 212), determining whether the gain value is equal to a previous gain value (decision block 214), and storing a zero bit when the gain value is equal to the previous gain value (process block 216). Additionally, when the gain value does not equal the previous gain value, the process 210 includes storing a one bit (process block 218), determining whether the gain value is equal to zero (decision block 220), storing a zero bit when the gain value is equal to zero (process block 222), and entropy encoding the gain value when the gain value is not equal to zero (process block 224). In some embodiments, the process 210 may be implemented by executing instructions stored in a tangible non-transitory computer-readable medium, such as the device memory 98, using processing circuitry, such as the device processor 96.

Accordingly, in some embodiments, the design device 94 may determine a gain value associated with a current gain map entry 174 in an intermediate gain run from the uncompressed gain map 170 (process block 212). Additionally, the design device 94 may determine a gain value associated with a directly previous gain map entry 174 from the uncompressed gain map 170. In some embodiments, image data corresponding with a display pixel row may be processed from left to right. Thus, in such embodiments, the directly previous gain map entry 174 may be the left neighbor of the current gain map entry 174.

As described above, a gain map entry 174 may include multiple gain values each associated with a different color component and/or a different sub-pixel. Generally, factors affecting gain values to be applied at adjacent display pixels 136 may be relatively similar. As such, gain values corresponding to the same color component at adjacent pixel positions may be relatively similar or even the same. Thus, the design device 94 may compare the gain value included in the current gain map entry 174 with a gain value associated with the same color component in the directly previous gain map entry 174 to determine whether they are equal (decision block 214).

When the gain values are equal, the design device 94 may store a zero bit in the gain value map 104 (process block 216). On the other hand, when the gain values are not equal, the design device 94 may store a one bit in the gain value map 104 (process block 218). Thus, when the compressed gain map 90 is subsequently decompressed, the first bit associated with the current gain map entry 174 may indicate whether a gain value in the current gain map entry 174 is the same as a corresponding gain value in the directly previous gain map entry 174. Moreover, when the gain values are equal, compressing in this manner may obviate bits that would otherwise be used to explicitly indicate one or more of the gain values, thereby enabling size of the compressed gain map 90 to be reduced.

When the gain values are not equal, the design device 94 may determine whether the gain value in the current gain map entry 174 is equal to zero (decision block 220). Additionally, when the gain value in the current gain map entry 174 is equal to zero, the design device 94 may store a zero bit in the gain value map 104 (process block 222). Thus, when the gain value of the current gain map entry 174 is equal to zero, compressing in this manner may obviate bits that would otherwise be used to explicitly indicate the gain value, thereby enabling size of the compressed gain map 90 to be reduced.

On the other hand, when the gain value is not equal to zero, the design device 94 may entropy encode the gain value of the current gain map entry 174 (process block 224). In some embodiments, the design device 94 may be entropy encode the gain value using an exponential-Golomb encoding algorithm. In this manner, the design device 94 may determine the gain value map 104 such that gain value map entries indicate gain values associated with pixel positions in each intermediate gain run.

Utilizing the compression techniques described above, the design device 94 may determine the compressed gain map 90, which includes the run map 100, the position map 102, the gain value map 104, and one or more programmable indicators (e.g., a starting row run indicator 108 and/or a position gain value indicator 110). It should be appreciated that the compression techniques may be applicable any uncompressed gain map 170, for example, even when not implemented to apply gain values along a display region border. In some embodiments, compression efficiency of the described compression techniques may improve as number of uncoded rows increases, number of pixel positions in position gain runs increases, number of consecutive pixel positions associated with the same gain value increases, and/or number of pixel positions in intermediate gain runs decreases. Thus, in some embodiments, the compression techniques may be useful for compressing a gain map to be applied to relatively uniform content.

Returning to the process 112 of FIG. 10, the design device 94 may store the compressed gain map 90 in a memory component to enable subsequent access from the memory component (process block 118). As described above, size of a compressed gain map 90 may be smaller than size of a corresponding uncompressed gain map 170. In some embodiments, this reduction in size may enable the compressed gain map 90 to be stored in the internal memory 46 of the display pipeline 36, which, as described above, may facilitate improving processing efficiency and/or reducing implementation associated cost. In other embodiments, the compressed gain map 90 may nevertheless be stored in the external memory 44. In any case, as described above, the sub-pixel layout resampler block 56 may subsequently access the gain map and process image data based at least in part on gain values indicated by the gain map.

Figure 23:
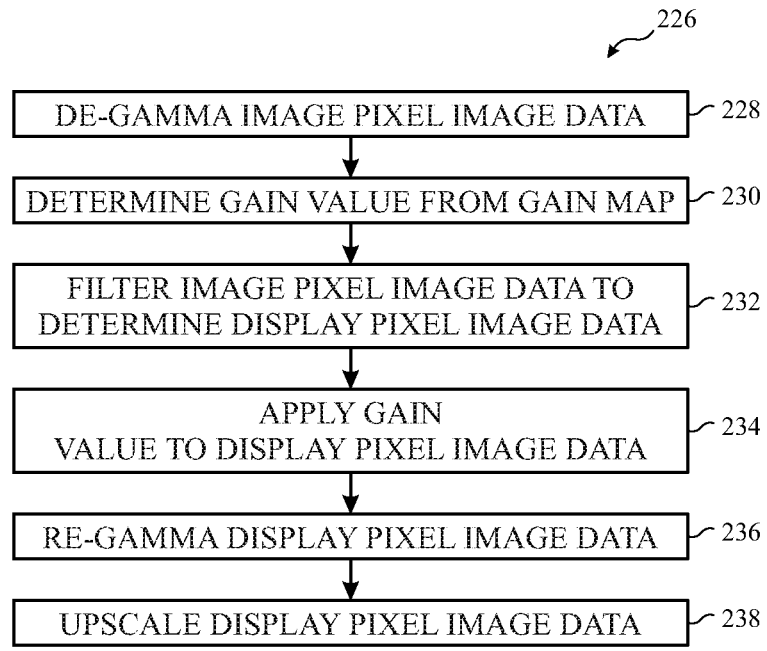
FIG. 23 is a flow diagram of a process for operating the sub-pixel layout resampler block of FIG. 8, in accordance with an embodiment.

To help illustrate, one embodiment of a process 226 for operating a sub-pixel layout resampler block 56 is described in FIG. 23. Generally, the process 226 includes de-gamma converting image pixel image data (process block 228), determining a gain value from a gain map (process block 230), filtering the image pixel image data to determine display pixel image data (process block 232), applying the gain value to the display pixel image data (process block 234), re-gamma converting the display pixel image data (process block 236), and upscaling the display pixel image data (process block 238). In some embodiments, the process 226 may be implemented based on circuit connections formed in the display pipeline 36. Additionally or alternatively, in some embodiments, the process 226 may be implemented by executing instructions stored in a tangible, non-transitory, computer-readable medium, such as the controller memory 52, using processing circuitry, such as the controller processor 50.

Accordingly, in some embodiments, the sub-pixel layout resampler block 56 may de-gamma convert image pixel image data 70 (process block 228). As described above, the sub-pixel layout resampler block 56 may receive image pixel image data 70 in a gamma (e.g. non-linear) domain. To facilitate subsequent processing, the sub-pixel layout resampler block 56 may de-gamma by converting the image pixel image data 70 from a gamma domain to a linear domain.

Additionally, the sub-pixel layout resampler block 56 may determine one or more gain value from a gain map (process block 230). As described above, in some embodiments, an uncompressed gain map 170 may be stored in the external memory 44. Thus, in such embodiments, the sub-pixel layout resampler block 56 may retrieve at least a portion (e.g., gain map entry 174) of the uncompressed gain map 170, which explicitly indicates one or more gain values associated with a corresponding pixel position, from the external memory 44 via a direct memory access channel 58.

As described above, in other embodiments, a compressed gain map 90 may be stored in the internal memory 46. Thus, in such embodiments, the sub-pixel layout resampler block 56 may retrieve at least a portion of the compressed gain map 90 from the internal memory 46. Since compressed, the sub-pixel layout resampler block 56 may decompress the compressed gain map 90 to determine one or more gain values associated with a corresponding pixel position.

Figure 24:
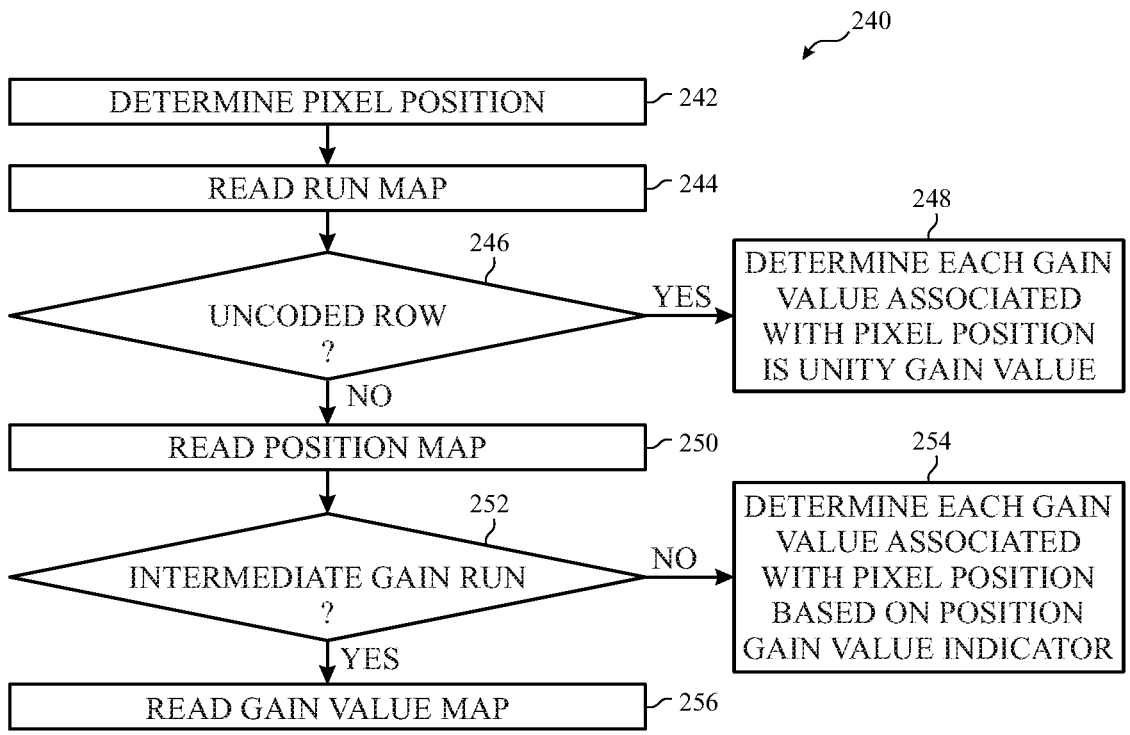
FIG. 24 is a flow diagram of a process for determining a gain value to be implemented by the sub-pixel layout resampler block of FIG. 8 from the compressed gain map, in accordance with an embodiment.

One embodiment of a process 240 for decompressing a compressed gain map 90 is described in FIG. 24. Generally, the process 240 includes determining a pixel position (process block 242), reading a run map (process block 244), determining whether the pixel position is in an uncoded row (decision block 246), and determining that each gain value associated with the pixel position is a unity gain value when the pixel position is in an uncoded row (process block 248). When the pixel position is not in an uncoded row, the process 240 includes reading a position map (process block 250), determining whether the pixel position is in an intermediate gain run (decision block 252), determining each gain value associated with the pixel position based on a position gain value indicator when the pixel position is not in an intermediate gain run (process block 254), and reading a gain value map when the pixel position is in an intermediate gain run (process block 256). In some embodiments, the process 240 may be implemented based on circuit connections formed in the display pipeline 36. Additionally or alternatively, in some embodiments, the process 240 may be implemented by executing instructions stored in a tangible, non-transitory, computer-readable medium, such as the controller memory 52, using processing circuitry, such as the controller processor 50.

Accordingly, in some embodiments, the sub-pixel layout resampler block 56 may determine a pixel position corresponding with received image pixel image data 70 (process block 242). In some embodiments, the sub-pixel layout resampler block 56 may receive image pixel image data 70 as a bit stream. Thus, in such embodiments, the sub-pixel layout resampler block 56 may determine the pixel position based at least in part on order with which the image pixel image data 70 is received and/or resolution of the electronic display 12. Based on the pixel position, the sub-pixel layout resampler block 56 may determine a corresponding gain map entry 174 and, thus, a gain map row 172 that includes a gain map entry 174.

Additionally, the sub-pixel layout resampler block 56 may read the run map 100 to determine row categorization of the gain map row 172 (process block 244). As described above, the run map 100 may indicate number of gain map rows 172 included in each row run 194. Thus, based at least in part the run map 100, the sub-pixel layout resampler block 56 may identify a row run 194 that includes the gain map row 172 and, thus, the pixel position. In some embodiments, run map 100 may be stored in the internal memory 46 of the display pipeline 36. Thus, in such embodiments, the sub-pixel layout resampler block 56 may read the run map 100 from the internal memory 46.

To facilitate determining categorization of the row run, the sub-pixel layout resampler block 56 may read a starting row run indicator 108. As described above, a starting row run indicator 108 may indicate whether a corresponding row run 194 is a coded row run or an uncoded row run. To facilitate reducing size of the compressed gain map 90, in some embodiments, a starting row run indicator 108 may only be specified for a first row run 194A. In such embodiments, when the row run 194 is not the first row run 194A, the sub-pixel layout resampler block 56 may determine categorization of the row run 194 based at least in part on categorization of a directly previous (e.g., top neighbor) row run 194. In other words, the sub-pixel layout resampler block 56 may determine categorization of the row run 194 based on number of other row runs 194 separating the row run 194 from the first row run 194A.

Accordingly, based at least in part the run map 100 and the starting row run indicator 108, the sub-pixel layout resampler block 56 may determine whether the row run 194 is an uncoded row run and, thus, whether the gain map row 172 including the pixel position is an uncoded row (decision block 246). As described above, a gain map row 172 may be an uncoded row when each of the gain values are equal to unity. Thus, when the gain map row 172 is an uncoded row, the sub-pixel layout resampler block 56 may determine that each gain value to be used to process the image pixel image data 70 is a unity gain value (process block 248).

On the other hand, not an uncoded row, the sub-pixel layout resampler block 56 may determine that the gain map row 172 is a coded row and, thus, read the position map 102 (process block 250). As described above, a position map 102 may indicate pixel positions included in each gain run of a coded row. In some embodiments, position map 102 may be stored in the internal memory 46 of the display pipeline 36. Thus, in such embodiments, the sub-pixel layout resampler block 56 may read the position map 102 from the internal memory 46.

Additionally, in some embodiments, a position map 102 may be entropy encoded. Thus, in such embodiments, the sub-pixel layout resampler block 56 may determine pixel positions included in each gain run by entropy decoding the position map 102. For example, the sub-pixel layout resampler block 56 may entropy decode the position map 102 using an exponential-Golomb decoding algorithm. Furthermore, in some embodiments, a position map 102 may indicate the pixel positions included in a gain run relative to another gain run based on a position difference. Thus, in such embodiments, the sub-pixel layout resampler block 56 may determine the pixel positions included in the gain run by applying the position difference to a (e.g., starting or ending) pixel position in the other gain run.

Based at least in part on the position map 102, the sub-pixel layout resampler block 56 may determine whether the pixel position is in an intermediate gain run (decision block 252). As described above, each gain map entry 174 in an intermediate gain run includes one or more intermediate gain values (e.g., greater than zero and less than unity). Accordingly, when not in an intermediate gain run, the sub-pixel layout resampler block 56 may determine that the pixel position is in a position run and, thus, determine the gain values to be used to process the image pixel image data 70 based on a corresponding position gain value indicator 110. In some embodiments, a position gain value indicator 110 may be stored in a programmable register 106. Thus, in such embodiments, the sub-pixel layout resampler block 56 may determine the position gain value indicator 110 by polling the programmable register 106.

On the other hand, when in an intermediate gain run, the sub-pixel layout resampler block 56 may read the gain value map 104 (process block 256). As described above, a gain value map 104 may indicate gain values in an intermediate gain run. In some embodiments, the gain value map 104 may be stored in the internal memory 46 of the display pipeline 36. Thus, in such embodiments, the sub-pixel layout resampler block 56 may read the gain value map 104 from the internal memory 46.

Additionally, in some embodiments, a gain value map 104 may be entropy encoded. Thus, in such embodiments, the sub-pixel layout resampler block 56 may determine the gain values associated with the pixel position by entropy decoding the gain value map 104. For example, the sub-pixel layout resampler block 56 may entropy decode the gain value map 104 using an exponential-Golomb decoding algorithm. In this manner, the sub-pixel layout resampler block 56 may decompress the compressed gain map 90 to determine one or more gain value associated with a pixel position corresponding with the image pixel image data 70.

Returning to the process 226 of FIG. 23, the sub-pixel layout resampler block 56 may filter the image pixel image data 70 to determine corresponding display pixel image data 72 (process block 232). As described above, the sub-pixel layout resampler block 56 may filter the image pixel image data 70 based on filter parameters, such as offset filter phase values and/or offset sub-pixel filter coefficients. Additionally, in some embodiments, the sub-pixel layout resampler block 56 may determine the filter parameters to be applied based at least in part on the gain values determined from the gain map.

Figure 25:
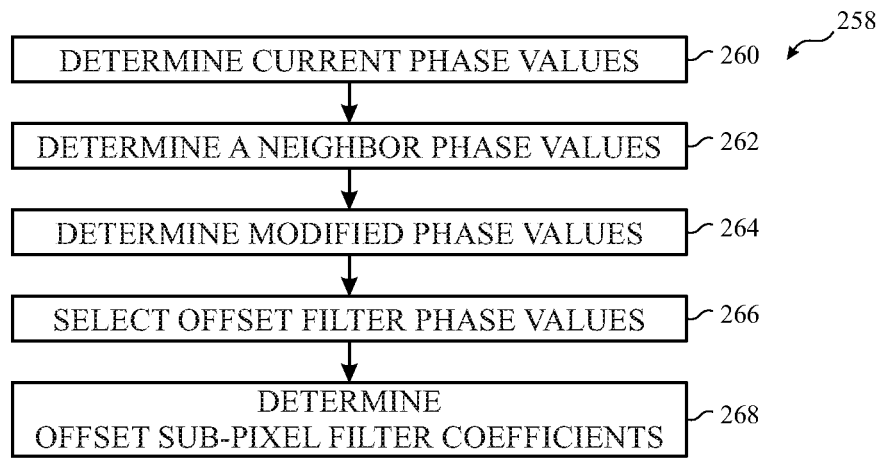
FIG. 25 is a flow diagram of a process for determining filter parameters to be implemented by the sub-pixel layout resampler block of FIG. 8, in accordance with an embodiment.

To help illustrate, one embodiment of a process 258 for determining filter phase values and offset sub-pixel filter coefficients is described in FIG. 25. Generally, the process 258 includes determining current phase values (process block 260), determining neighbor phase values (process block 262), determining modified phase values (process block 264), selecting offset filter phase values (process block 266), and determining offset sub-pixel filter coefficients (process block 268). In some embodiments, the process 258 may be implemented based on circuit connections formed in the display pipeline 36. Additionally or alternatively, in some embodiments, the process 258 may be implemented by executing instructions stored in a tangible non-transitory computer-readable medium, such as the controller memory 52, using processing circuitry, such as the controller processor 50.

Accordingly, in some embodiments, the sub-pixel layout resampler block 56 may determine phase values associated with a current image pixel block, which includes a current image pixel corresponding with the received image pixel image data 70 (process block 260). In some embodiments, the current image pixel block may be a 2×2 block of image pixels surrounding an offset sub-pixel of a current display pixel 136 corresponding with the current image pixel. Additionally, in some embodiments, the sub-pixel layout resampler block 56 may determine a current phase value based at least in part on difference metrics associated with the current image pixel block, such as sum of absolute difference between the current image pixel block and a neighbor image pixel block offset from the current image pixel block. In some embodiments, a current phase value may indicate variation of the filtering to be applied compared to a default filter (e.g., equal interpolation) mode.

Additionally, the sub-pixel layout resampler block 56 to determine phase values associated with each neighbor image pixel block (process block 262). In some embodiments, the sub-pixel layout resampler block 56 may determine the neighbor phase values associated with a neighbor block in a similar manner as the current phase values associated with the current block. For example, the sub-pixel layout resampler block 56 may determine a top neighbor phase value corresponding with the top neighbor block based at least in part on difference metrics associated with the top neighbor image pixel block.

Based at least in part on the current phase values and the neighbor phase values, the sub-pixel layout resampler block 56 may determine modified phase values (process block 264). In some embodiments, the sub-pixel layout resampler block 56 may determine the modified phase values by filtering the current phase values based on the neighbor phase values. For example, the sub-pixel layout resampler block 56 may determine a modified filter phase values by filtering the current filter phase values with a neighbor filter phase value of each neighbor image pixel block.

Additionally, the sub-pixel layout resampler block 56 may determine offset filter phase values (process block 266). In some embodiments, the sub-pixel layout resampler block 56 may set the offset filter phase values based at least in part on the current phase values and/or the modified phase values. For example, the sub-pixel layout resampler block 56 may set the offset filter phase values as the current phase values or as the modified phase values based at least in part on gain values (e.g., offset gain value and/or co-located gain value) associated with the pixel position of the current image pixel in a gain map.

Figure 26:
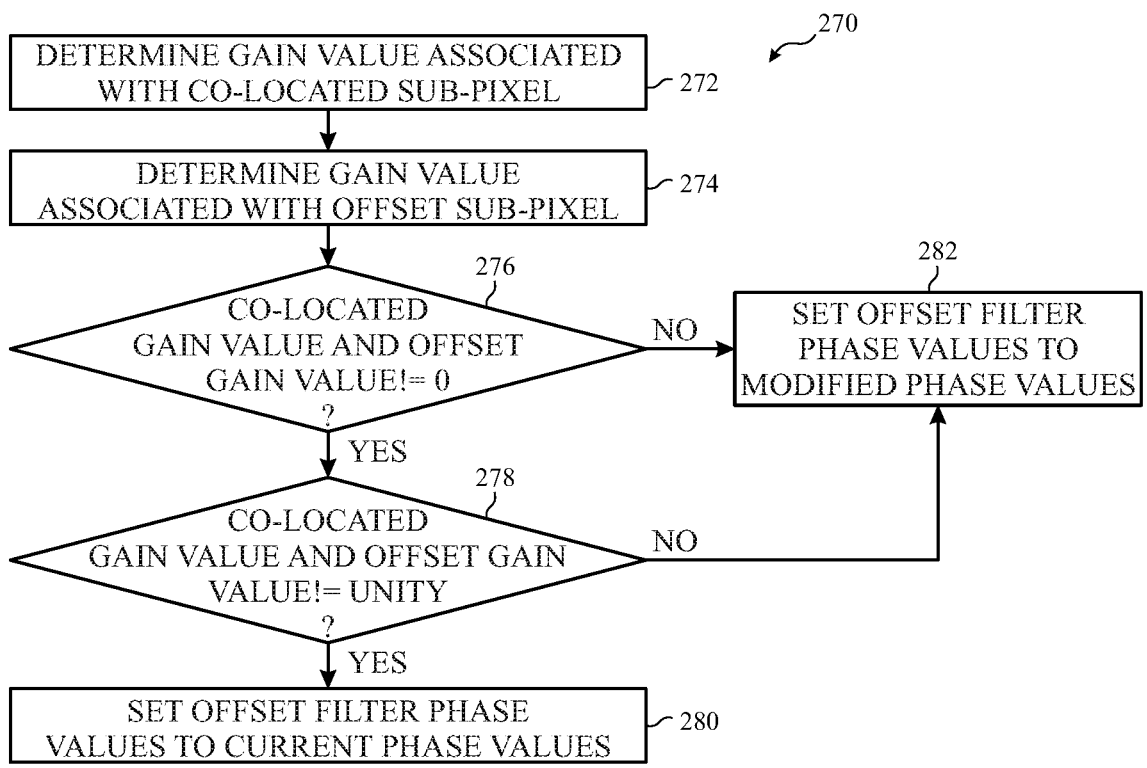
FIG. 26 is a flow diagram of a process for determining offset filter phase values based at least in part on a gain value to be applied at an offset sub-pixel, in accordance with an embodiment.

To help illustrate, one embodiment of a process 270 for determining the offset filter phase values is shown in FIG. 26. Generally, the process 270 includes determining gain value associated with a co-located sub-pixel (process block 272), determining gain value associated with an offset sub-pixel (process block 274), determining whether the co-located gain and the offset gain both are not zero (decision block 276), and determining whether the co-located gain and the offset gain are both not unity (decision block 278). When the co-located gain is not zero or unity and the offset gain is not zero or unity, the process 270 includes setting offset filter phase values to current phase values (process block 280). Otherwise, the process 270 includes setting the offset filter phase values to modified phase values (process block 282). In some embodiments, the process 270 may be implemented based on circuit connections formed in the display pipeline 36. Additionally or alternatively, in some embodiments, the process 270 may be implemented by executing instructions stored in a tangible non-transitory computer-readable medium, such as the controller memory 52, using processing circuitry, such as the controller processor 50.

Accordingly, in some embodiments, the sub-pixel layout resampler block 56 may determine a gain value to be applied at the co-located sub-pixel in the current display pixel (process block 272). Additionally, the controller 42 may instruct the sub-pixel layout resampler block 56 to determine a gain value to be applied at the offset sub-pixel in the current display pixel (process block 274). In some embodiments, the sub-pixel layout resampler block 56 may determine the gain value associated with the co-located sub-pixel and/or the gain value associated with the offset sub-pixel based at least in part on a compressed gain map 90, for example, by decompressing the compressed gain map 90 using the process 240 of FIG. 24.

Based at least in part on the gain values, the sub-pixel layout resampler block 56 may set the offset filter phase values as the modified phase values (process block 282) or set the offset filter phase values as the current phase values (process block 280). For example, the sub-pixel layout resampler block 56 may set an offset filter phase to the current filter phase when the co-located gain and offset gain both do not equal zero or unity. On the other hand, the sub-pixel layout resampler block 56 may set the offset filter phase to the modified filter phase when at least one of the co-located gain and the offset gain is equal to zero or unity. In this manner, the sub-pixel layout resampler block 56 may determine the offset filter phase values based at least in part on the gain values associated with a current pixel position.

Returning to the process 258 of FIG. 25, the sub-pixel layout resampler block 56 may determine offset sub-pixel filter coefficients based at least in part on the offset filter phase values (process block 268). In some embodiments, the offset sub-pixel filter coefficients may used to implement the offset filter phase values. Thus, in such embodiments, the sub-pixel layout resampler block 56 may determine the offset sub-pixel filter coefficients to be applied to by the filter block 82. In this manner, the sub-pixel layout resampler block 56 may determine filter parameters (e.g., offset filter phase values and/or offset sub-pixel filter coefficients) to be applied to the image pixel image data 70 based at least in part on the gain values associated with a current pixel position in a gain map.

Returning to the process 226 of FIG. 23, the sub-pixel layout resampler block 56 may determine display pixel image data 72 corresponding with the current pixel position based at least in part on the filter parameters (process block 114). In some embodiments, the sub-pixel layout resampler block 56 may filter image pixel image data 70 corresponding with a group of image pixels around the current image pixel based on the filter parameters to determine the display pixel image data 72.

After filtering, the sub-pixel layout resampler block 56 may apply gain values to the display pixel image data 72 (process block 234). As described above, a gain map may indicate gain values associated with each pixel position. Additionally, as described above, programmable border gain value indicators 92 may indicate gain values selectively applied at pixel positions along the display region border. Thus, in some embodiments, the sub-pixel layout resampler block 56 may determine whether to apply gain values indicated by the gain map or gain values indicated by a programmable border gain value indicator 92.

Figure 27:
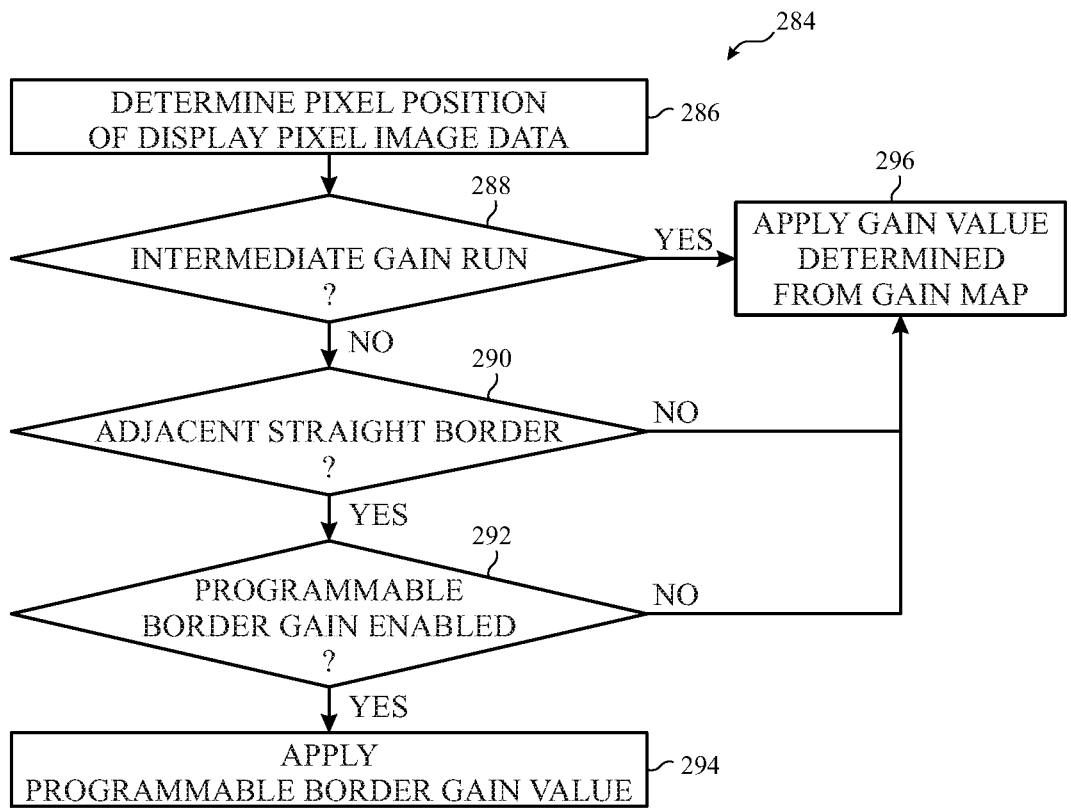
FIG. 27 is a flow diagram of a process for applying a gain value to determine display pixel image data, in accordance with an embodiment.

To help illustrate, one embodiment of a process 284 for applying a gain value to display pixel image data 72 is described in FIG. 27. Generally, the process 284 includes determining a pixel position of display pixel image data (process block 286), determining whether the pixel position is in an intermediate gain run (decision block 288), determining whether the pixel position is adjacent a straight border (decision block 290), determining whether programmable border gain is enabled (decision block 292), and applying a programmable border gain value when the pixel position is not in an intermediate gain run, the pixel position is adjacent a straight border, and programmable border gain is enabled (process bock 294). Additionally, the process 284 includes applying a gain value determined from a gain map when the pixel position is in an intermediate gain run, the pixel position is not adjacent a straight border, or the programmable border gain is not enabled (process block 296). In some embodiments, the process 284 may be implemented based on circuit connections formed in the display pipeline 36. Additionally or alternatively, in some embodiments, the process 284 may be implemented by executing instructions stored in a tangible non-transitory computer-readable medium, such as the controller memory 52, using processing circuitry, such as the controller processor 50.

Accordingly, in some embodiments, the sub-pixel layout resampler block 56 may determine a pixel position corresponding with display pixel image data 72 (process block 286). As described above, display pixel image data 72 may be determined by processing corresponding image pixel image data 70. In other words, the display pixel image data 72 may correspond to the same pixel position as the image pixel image data 70. As such, the sub-pixel layout resampler block 56 may determine the pixel position corresponding with the display pixel image data 72 by determining the pixel position corresponding with the image pixel image data 70, for example, based at least in part on order with which the image pixel image data 70 is received and/or resolution of the electronic display 12.

Additionally, the sub-pixel layout resampler block 56 may determine whether the pixel position is in an intermediate gain run (process block 288). As described above, the run map 100 may indicate number of gain map rows 172 included in each row run 194 and a starting row run indicator 108 may indicate categorization of each row run 194. Accordingly, based at least in part on the run map 100 and the starting row run indicator 108, the sub-pixel layout resampler block 56 may determine categorization of a row run 194 including the pixel position and, thus, whether the pixel position is included in a coded row or an uncoded row. Since an uncoded row includes only unity gain values, the sub-pixel layout resampler block 56 may determine that the pixel position is not in an intermediate gain run when in an uncoded row.

Additionally, as described above, the position map 102 may indicate pixel positions included in each gain run of a coded row and a position gain value indicator 110 may be associated with each position gain run. Thus, based at least in part on the position map 102 and the position gain value indicators 110, the sub-pixel layout resampler block 56 may determine pixel positions in each intermediate gain run and, thus, whether the pixel position is in an intermediate gain run.

Furthermore, the sub-pixel layout resampler block 56 may determine whether the pixel position is adjacent a straight border of a display region (decision block 290). In some embodiments, the border detection block 86 may determine whether the pixel position is adjacent a straight border based at least in part on characteristics of the display region. For example, the border detection block 86 may determine whether the pixel position is adjacent a straight border based at least in part on location of the display region border and/or pixel positions predefined as adjacent a straight border. As described above, in some embodiments, expected characteristics of the display region may be predetermined and stored in a memory component, such as device memory 98. Thus, in such embodiments, the design device 94 may poll the memory component to determine the characteristics of the display region.

The sub-pixel layout resampler block 56 may also determine whether programmable border gain is enabled (decision block 292). In some embodiments, the sub-pixel layout resampler block 56 may determine whether programmable border gain is enabled based at least in part on indicator, for example, stored in the internal memory 46 or a programmable register 106. For example, the sub-pixel layout resampler block 56 may determine that programmable border gain is enabled when the indicator has a first value (e.g., 1 bit) and that programmable border gain is enabled when the indicator has a second value (e.g., 0 bit).

Based on these determinations, the sub-pixel layout resampler block 56 may apply either gain values determined from the gain map (process block 296) or a programmable border gain value 92 (process block 294). As described above, applying gain values from the gain map may facilitate adjusting an image or image frame for display on a display region with a different (e.g. non-rectangular) shape, for example, by applying a black mask at pixel positions outside the display region. Additionally, as described above, applying gain values from the gain map may dim sub-pixels along a rounded border of the display region to facilitate reducing likelihood of producing perceivable aliasing along the rounded border.

Moreover, in some embodiments, the programmable border gain value may be determined to reduce likelihood of producing perceivable color fringing along a border (e.g., straight border) of the display region. In some instances, fringing occurring along a border may be affected by sub-pixel layout implemented in an electronic display 12. In other words, fringing occurring along different borders may vary. For example, when display pixels 136 of the electronic display each include a green sub-pixel and alternatingly either a red sub-pixel or a blue sub-pixel, green fringing may occur along a first (e.g., top) straight border while violet fringing may occur along a second (e.g., left) straight border.

Thus, to reduce likelihood of producing perceivable color fringing, different programmable border gain values may be associated with different borders. As such, when a programmable border gain value is to be applied, the sub-pixel layout resampler block 56 may determine which border is adjacent the pixel position and select a corresponding programmable border gain value. In this manner, the sub-pixel layout resampler block 56 may facilitate improving perceived image quality of an electronic display by selectively (e.g., adaptively) applying gain values to the display pixel image data 72.

Returning to the process 226 of FIG. 23, when output image data is expected to be in the gamma domain, the sub-pixel layout resampler block 56 may convert the display pixel image data 72 from the linear domain to the gamma domain (process block 236). Furthermore, when output image data is expected to be in a source format (e.g., RGB format), the sub-pixel layout resampler block 56 may upscale the display pixel image data 72 to convert from a display format (e.g., GR or GB format) to the source format (process block 238). In some embodiments, the sub-pixel layout resampler block 56 may convert to the source format by adding image data corresponding with a missing color component to the display pixel image data 72.

Figure 28:
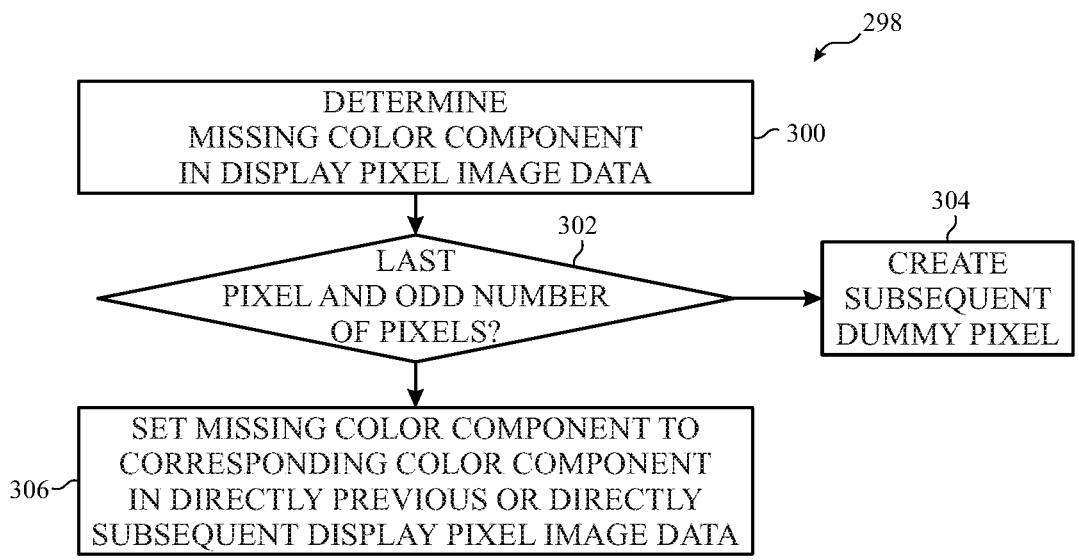
FIG. 28 is a flow diagram of a process for upscaling display pixel image data, in accordance with an embodiment.

To help illustrate, one embodiment of a process 298 for converting display pixel image data 72 from a display format to a source format is described in FIG. 28. Generally, the process 298 includes determining a missing color component in display pixel image data (process block 300), determining whether a display pixel corresponding with the display pixel image data is a last pixel and an image includes an odd number of image pixels (decision block 302), and creating a subsequent dummy pixel when the display pixel is the last pixel and the image includes an odd number of pixels (process block 304). Additionally, the process 298 includes setting the missing component to a corresponding color component in a directly previous or directly subsequent display pixel image data (process block 306). In some embodiments, the process 298 may be implemented based on circuit connections formed in the display pipeline 36. Additionally or alternatively, in some embodiments, the process 298 may be implemented by executing instructions stored in a tangible non-transitory computer-readable medium, such as the controller memory 52, using processing circuitry, such as the controller processor 50.

Accordingly, in some embodiments, the sub-pixel layout resampler block 56 may determine a missing component from the display pixel image data 72 corresponding with the current display pixel (process block 300). For example, when the display pixel image data 72 is in a GR format, the sub-pixel layout resampler block 56 may determine that the blue component is missing. On the other hand, when the display pixel image data 72 is in a GB format, the sub-pixel layout resampler block 56 may determine that the red component is missing.

To convert to the source format (e.g., RGB format), the controller 42 may instruct the sub-pixel layout resampler block 56 to copy image data of the missing color component from a directly previous or directly subsequent display pixel image data (process block 306). For example, when the blue color component is missing from current display pixel image data, the sub-pixel layout resampler block may copy blue component image data from directly previous display pixel image data into the current display pixel image data and copy red component image data from the current display pixel image data to the directly previous display pixel image data.

Thus, when the current display pixel is the last display pixel and the image includes an odd number of image pixels, subsequent display pixel image data may be unavailable for swapping color component image data with the current display pixel image data. Thus, the controller 42 may instruct the sub-pixel layout resampler block 56 to create a subsequent dummy pixel (process block 304). In some embodiments, the dummy pixel may include image data with each color component set to zero. In other embodiments, the dummy pixel may be a copy of other display pixel image data and/or include image data with color components set to any suitable value. In this manner, the sub-pixel layout resampler block 56 may determine display pixel image data 72, which when used to display an image provides improved perceived image quality.

As described above, in some embodiments, a compressed gain map 90 may indicate gain values associated with a pixel position 126 in a relative manner, for example, relative another pixel position 126. In such embodiments, the display pipeline 56 may experience data dependencies when decompressing a compressed gain map 90, thereby limiting decompression efficiency (e.g., rate with which gain values associated with a pixel position are determined).

To facilitate improving decompression efficiency, in some embodiments, pixel positions 126 and associated gain values may be grouped into multiple pixel regions, for example, by dividing an uncompressed gain map 170 into multiple uncompressed gain maps 170. By compressing each uncompressed gain map 170, multiple compressed gain maps 90 each corresponding to one of the pixel regions may be determined. In this manner, data dependencies between gain values associated with pixel positions in different pixel regions may be reduced. In fact, implementing multiple compressed gain maps 90 in this manner may enable the display pipeline 56 to vary order with which gain values are determined and, thus, access (e.g., fetch) pattern to the compressed gain maps. In some embodiments, the display pipeline 56 may control gain value determination order to improve memory access efficiency, for example, by implementing a random access pattern.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
an electronic display, wherein the electronic display comprises:

a display region with a rounded border, wherein the display region comprises a first display pixel of a plurality of pixels at a first pixel position adjacent the rounded border; and a display pipeline communicatively coupled to the electronic display, wherein the display pipeline is configured to:

receive first image data that indicates target luminance at the first pixel position in an image frame, wherein the image frame has a rectangular shape;

determine a first gain value associated with the first pixel position from a compressed gain map that is based on an uncompressed gain map, wherein the compressed gain map comprises a coded row run of one or more coded rows of the uncompressed gain map and an uncoded row run of one or more uncoded rows of the uncompressed gain map, wherein the coded row run indicates a gain map entry for a respective pixel position of a plurality of pixels associated with the coded row run, wherein the coded row run comprises at least one gain map entry of a gain less than unity, and wherein the uncoded rows indicate gain map entries of a row of pixels of unity gain, wherein determining the first gain value comprises:

determining whether the first pixel position is in the coded row run or the uncoded row run;

in response to determining that the first pixel position is in the uncoded row run, determining that the first gain value is unity gain; and in response to determining that the first pixel position is in the coded row run, decompressing the compressed gain map to the uncompressed gain map and determining the first gain value based at least in part on a gain value map comprising a gain value for the first pixel position;

determine second image data that indicates target luminance of the first display pixel to display the image frame by processing the first image data based at least in part on the determined first gain value; and output the second image data to the electronic display to facilitate displaying a non-rectangular portion of the image frame on the display region.

2. The electronic device of claim 1, wherein, to determine the second image data, the display pipeline is configured to:

determine filter parameters based at least in part on the first gain value and a sub-pixel layout of the electronic display;

determine display pixel image data by filtering the first image data using the filter parameters; and determine the second image data by applying the first gain value to the display pixel image data to facilitate reducing likelihood of producing perceivable aliasing along the rounded border when the non-rectangular portion of the image frame is displayed on the display region by linearly dimming the first display pixel.

3. The electronic device of claim 1, wherein the display pipeline is configured to:

receive third image data that indicates target luminance at a second pixel position in the image frame, wherein the second pixel position is outside the display region of the electronic display;

determine a second gain value associated with the second pixel position from the compressed gain map, wherein the second gain value is a zero gain value;

determine fourth image data by applying the second gain value to the third image data to facilitate applying a black mask around the non-rectangular portion of the image frame; and output the fourth image data to the electronic display to facilitate displaying the non-rectangular portion of the image frame on the display region.

4. The electronic device of claim 1, wherein:

the display pipeline comprises internal memory configured to store the compressed gain map, wherein the compressed gain map comprises a run map, a position map, and the gain value map determined based on the uncompressed gain map that explicitly maps each pixel position to a gain value set; and the display pipeline, to determine the second image data, is configured to:

determine whether the first pixel position is in a coded row of the uncompressed gain map based at least in part on the run map, wherein the coded row comprises at least one gain map entry that associates a corresponding pixel position to a gain value less than unity;

determine whether the first pixel position is in an intermediate gain run based at least in part on the position map when the first pixel position is in the coded row, wherein the intermediate gain run comprises gain map entries that each associate a corresponding pixel position to at least one gain value greater than zero and less than unity; and determine the first gain value based at least in part on the gain value map when the pixel position is in the intermediate gain run.

5. The electronic device of claim 4, wherein:

the run map indicates number of gain map rows of the uncompressed gain map included in each row run, wherein a row run comprises one or more consecutive gain map rows with a same row categorization;

the position map indicates number of gain map entries of the uncompressed gain map included in each gain run of the coded row, wherein a gain run comprises one or more consecutive gain map entries with a same entry categorization; and the gain value map indicates the gain value set associated with each pixel position in the intermediate gain run.

6. The electronic device of claim 4, wherein the position map indicates pixel positions associated with a gain value greater than zero and less than unity by a corresponding gain map entry of the uncompressed gain map.

7. The electronic device of claim 4, wherein:

the compressed gain map comprises a starting row run indicator stored in a programmable register, wherein the starting row run indicator indicates that a first row run identified in the uncompressed gain map is the coded row run; and the display pipeline, to determine whether the first pixel position is in the coded row, is configured to:

determine whether the first pixel position is in the first row run based at least in part on the run map;

determine that the first pixel position is in the coded row when the first pixel position is in the first row run; and when the first pixel position is not in the first row run:

determine a second row run that includes the first pixel position based at least in part on the run map; and determine that the first pixel position is in the coded row when the second row run is separated from the first row run by an odd number of row runs.

8. The electronic device of claim 4, wherein:
the compressed gain map comprises a position gain value indicator stored in a programmable register, wherein the position gain value indicator indicates whether a position gain run in the coded row is a zero gain run or a unity gain run; and
the display pipeline is configured to, when the first pixel position is not in the intermediate gain run:
determine that the first pixel position is in the position gain run based at least in part on the position map;
determine that the first gain value associated with the first pixel position is zero when the position gain value indicator indicates that the position gain run is the zero gain run; and
determine that the first gain value associated with the first pixel position is unity when the position gain value indicates that the position gain run is the unity gain run.

9. The electronic device of claim 4, wherein, to determine the first gain value, the display pipeline is configured to determine that the first gain value is unity when the first pixel position is not in the coded row.

10. The electronic device of claim 1, wherein:
the first display pixel comprises a sub-pixel that controls luminance of a color component at the first pixel position in the display region;
the first image data indicates target luminance of the color component at the first pixel position in the image frame; and
the first gain value is inversely proportional to a shortest distance expected to be present between the sub-pixel and the rounded border of the display region.

11. The electronic device of claim 1, wherein:
the electronic display comprises a second display pixel at a second pixel position adjacent a straight border of the display region; and
the display pipeline is configured to:
receive third image data that indicates target luminance at the second pixel position in the image frame;
determine a second gain value associated with the second pixel position from the compressed gain map;
determine display pixel image data by filtering the third image data using filter parameters determined based at least in part on the second gain value; and
determine fourth image data that indicates target luminance of the second display pixel to display the image frame by applying a programmable border gain value associated with the straight border to the display pixel image data to facilitate reducing likelihood of producing perceivable color fringing along the straight border when the non-rectangular portion of the image frame is displayed on the display region by dimming the second display pixel.

12. The electronic device of claim 1, wherein the electronic device comprises a portable phone, a media player, a personal data organizer, a handheld game platform, a tablet device, a computer, or any combination thereof.

13. A method for facilitating display of a rectangular image on an electronic display with a non-rectangular display region, comprising:
receiving first image pixel image data from an image data source, wherein the first image pixel image data indicates target luminance at a first pixel position of a plurality of pixel positions in the rectangular image;
determining a first gain value associated with the first pixel position from a compressed gain map that is based on an uncompressed gain map, wherein the compressed gain map comprises a coded row run of one or more coded rows of the uncompressed gain map and an uncoded row run of one or more uncoded rows of the uncompressed gain map, wherein the coded row run indicates a gain map entry for a respective pixel position of a plurality of pixel positions associated with the coded row run, wherein the coded row run comprises at least one gain map entry of a gain less than unity, and wherein the uncoded row run indicates gain map entries of a row of pixels of unity gain, wherein determining the first gain value comprises:
determining whether the first pixel position is in the coded row run or the uncoded row run;
in response to determining that the first pixel position is in the uncoded row run, determining that the first gain value is unity gain; and
in response to determining that the first pixel position is in the coded row run, decompressing the compressed gain map to the uncompressed gain map and determining the first gain value based at least in part on a gain value map comprising a gain value for the first pixel position;
determining filter parameters to be applied to the first image pixel image data based at least in part on the first gain value;
determining first display pixel image data by filtering the first image pixel image data based at least in part on the filter parameters, wherein the first display pixel image data indicates target luminance of a first sub-pixel at the first pixel position;
applying the determined first gain value to the first display pixel image data; and
outputting the first display pixel image data to the electronic display to facilitate displaying only a portion of the rectangular image on the non-rectangular display region of the electronic display.

14. The method of claim 13, comprising:
determining the uncompressed gain map, wherein the uncompressed gain map comprises a plurality of gain map entries that explicitly associate each pixel position with a gain value set;
categorizing each of the plurality of gain map entries as one of a unity gain map entry, an intermediate gain map entry, and a zero gain map entry;
categorizing each row of the gain map entries as one of the coded row or the uncoded row;
grouping each row of the gain map entries in a row run based at least in part on a corresponding row categorization;
determining a run map based at least in part on number of rows included in each row run;
grouping each of the gain map entries in each coded row in a gain run based at least in part on a corresponding entry categorization;
determining a position map based at least in part on number of gain map entries in each gain run;
determining the gain value map based at least in part on the gain value set indicated by the gain map entries in each intermediate gain run, wherein the gain value set associated with each gain map entry in an intermediate gain run comprises a gain value greater than zero and less than unity; and
storing the run map, the position map, and the gain value map in internal memory of a display pipeline as the compressed gain map to facilitate determining the first gain value associated with the first pixel position.

15. The method of claim 14, comprising:
reading the run map from the internal memory to identify a row run that includes the first pixel position;
determining whether the row run is the coded row run or the uncoded row run based at least in part on a starting row run indicator stored in a first programmable register of the internal memory; and
when the first pixel position is in the coded row run:
reading the position map from the internal memory to identify a gain run that includes the first pixel position;
determining whether the gain run is an intermediate gain run; and
reading the gain value map from the internal memory when the gain run is an intermediate gain run;
wherein determining the first gain value associated with the first pixel position comprises:
determining that the first gain value is unity when the row run is the uncoded row run;
determining that the first gain value is unity when a position gain value indicator stored in a second programmable register of the internal memory indicates that the gain run is a unity gain run;
determining that the first gain value is zero when the position gain value indicator indicates that the gain run is a zero gain run; and
determining that the first gain value is a value read from the gain value map when the gain run is an intermediate gain run.

16. The method of claim 13, comprising:
receiving second image pixel image data from the image data source, wherein the second image pixel image data indicates target luminance at a second pixel position in the rectangular image;
determining a second gain value associated with the second pixel position, wherein the second gain value is zero when the second pixel position is outside the non-rectangular display region of the electronic display;
determining second display pixel image data by processing the second image pixel image data based at least in part on the second gain value, wherein determining the second display pixel image data comprises applying the second gain value to facilitate applying a black mask at pixel positions outside the non-rectangular display region; and
outputting the second display pixel image data to the electronic display to facilitate displaying only the portion of the rectangular image on the non-rectangular display region.

17. A tangible, non-transitory, computer-readable medium storing instructions executable by one or more processors of an electronic device, wherein the instructions comprise instructions to:
determine, using the one or more processors, an uncompressed gain map comprising a plurality of gain map entries that each explicitly associates a corresponding pixel position with a gain value set;
determine, using the one or more processors, a compressed gain map based at least in part on the uncompressed gain map, wherein the instructions to determine the compressed gain map comprise instructions to:
determine a run map based at least in part on grouping of each gain map row of the uncompressed gain map into row runs, wherein each row run comprises either one or more consecutive gain map rows each categorized as a coded row or one or more consecutive gain map rows each categorized as an uncoded row, wherein the coded row defines the plurality of gain map entries having a gain less than unity for respective corresponding pixel positions, and wherein the uncoded row defines the plurality of gain map entries having a unity gain for respective corresponding pixel positions;
determine a position map based at least in part on grouping of each gain map entry in coded rows of the uncompressed gain map into either a position gain run or an intermediate gain run, wherein:
each intermediate gain run comprises one or more consecutive gain map entries each categorized as an intermediate gain entry; and
each position gain run comprises either one or more consecutive gain map entries each categorized as a unity gain entry or one or more consecutive gain map entries each categorized as a zero gain entry; and
determine a gain value map based at least in part on the gain value set indicated by each intermediate gain run entry; and
store the compressed gain map in internal memory of a display pipeline configured to be communicatively coupled to an electronic display to enable the display pipeline to process image data corresponding with an image to be displayed on the electronic display based at least in part on gain values determined by reading the compressed gain map.

18. The computer-readable medium of claim 17, wherein the instructions to determine the uncompressed gain map comprise instructions to:
determine an anti-aliasing region along a rounded border of a display region of the electronic display;
determine a first gain map entry that explicitly associates a first pixel position in the anti-aliasing region to a first gain value set, wherein the first gain value set comprises a gain value greater than zero and less than unity; and
determine a second gain map entry that explicitly associates a second pixel outside the anti-aliasing region and outside the display region to a second gain value set, wherein each gain value in the second gain value set is equal to zero to enable the display pipeline to apply a black mask on the image that facilitates displaying the image on the electronic display when shape of the image and the display region differ.

19. The computer-readable medium of claim 18, comprising instructions to:
determine a border gain value expected to reduce likelihood of producing fringing along a straight border of the display region when the image is displayed on the electronic display; and
store the border gain value in a programmable register of the internal memory;
wherein the instructions to determine the uncompressed gain map comprise instructions to determine a third gain map entry that explicitly associates a third pixel position along the straight border to a third gain value set to enable the display pipeline to:
filter image data corresponding with the third pixel position based at least in part on the third gain value set;
apply the border gain value to the image data when programmable border gain is enabled; and apply the third gain value set to the image data when programmable border gain is not enabled.

20. The computer-readable medium of claim 17, wherein:

the instructions to determine the run map comprise instructions to determine each run map entry of the run map to indicate number of gain map rows in a corresponding row run;

the instructions to determine the position map comprise instructions to determine position map entries of the position map to indicate pixel positions included in gain runs in each coded row;

the instructions to determine the gain value map comprises instructions to determine gain value map entries of the gain value map to indicate the gain value set associated with each pixel position in each intermediate gain run;

the instructions to determine the compressed gain map comprise instructions to:

determine a starting row run indicator that identifies a first row run as one of a coded row run and an uncoded row run; and determine a position gain value indicator associated with each position gain run, wherein the position gain value indicator identifies a corresponding gain run as one of a zero gain run and a unity gain run; and the instructions to store the compressed gain map in the internal memory comprise instructions to:

store the starting row run indicator in a first programmable register to enable the display pipeline to determine whether a pixel position is in a coded row; and store the position gain run indicator in a second programmable register to enable the display pipeline to determine whether the pixel position is associated with zero gain values or unity gain values when the pixel position is in a position gain run.

* * * * *